US012644608B2

(12) United States Patent (10) Patent No.: US 12,644,608 B2
Ji et al. (45) Date of Patent: Jun. 2, 2026

(54) COOKING APPARATUS AND CONTROL METHOD THEREOF

(71) Applicant: SAMSUNG ELECTRONICS CO., LTD., Suwon-si (KR)

(72) Inventors: Seongjae Ji, Suwon-si (KR); Sanghyun Yeo, Suwon-si (KR); Jaeseok Lee, Suwon-si (KR); Jihyung Ha, Suwon-si (KR); Moonkyu Kim, Suwon-si (KR); Jaegyeong Ma, Suwon-si (KR); Byungduck Seo, Suwon-si (KR); Sunghoo Lee, Suwon-si (KR); Jongho Lee, Suwon-si (KR); Seungcheol Jeong, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 51 days.

(21) Appl. No.: 18/402,321

(22) Filed: Jan. 2, 2024

(65) Prior Publication Data

US 2024/0137660 A1 Apr. 25, 2024
US 2024/0236509 A9 Jul. 11, 2024

Related U.S. Application Data

(63) Continuation of application No. PCT/KR2023/012421, filed on Aug. 22, 2023.

(30) Foreign Application Priority Data

Sep. 7, 2022 (KR) ........................ 10-2022-0113824
Feb. 3, 2023 (KR) ........................ 10-2023-0015109

(51) Int. Cl.
F24C 14/02 (2006.01)
F24C 14/00 (2006.01)
(Continued)

(52) U.S. Cl.
CPC .............. F24C 14/02 (2013.01); F24C 14/00 (2013.01); F24C 15/006 (2013.01); F24C 15/20 (2013.01);
(Continued)

(58) Field of Classification Search
CPC .. F24C 15/20; F24C 15/2007; F24C 15/2021; F24C 15/32; F24C 15/322; F24C 14/00; F24C 14/02
See application file for complete search history.

(56) References Cited

U.S. PATENT DOCUMENTS 6,686,567 B1 * 2/2004 Hwang ................... F24C 14/02
219/393
10,794,599 B2 10/2020 Jang et al.
(Continued)

FOREIGN PATENT DOCUMENTS

CN 109792802 A 5/2019
CN 111344520 A 6/2020
(Continued)

OTHER PUBLICATIONS

Espacenet, partial English-language machine translation of KR-10-2021-0003664 A (Year: 2025).*
(Continued)

*Primary Examiner* — David N Werner
(74) *Attorney, Agent, or Firm* — STAAS & HALSEY LLP

(57) ABSTRACT

A cooking apparatus includes a case, a cooking chamber formed inside the case, a camera configured to obtain an image inside of the cooking chamber, a transparent member, a camera cooling fan configured to blow air toward the camera, a motor configured to rotate the camera cooling fan, and a controller to be electrically connected to the camera and the motor. The controller is configured to operate the
(Continued)

camera to obtain a first image inside of the cooking chamber, configured to identify foreign substance-related information of a lens of the camera or the transparent member based on the first image, and configured to control an operation of the motor to perform a cleaning mode, in which the camera cooling fan is rotated at a first rotation speed for a first rotation time, based on the determining that the foreign substance is present.

19 Claims, 29 Drawing Sheets

(51) Int. Cl.

| | |
|---|---|
| *F24C 15/00* | (2006.01) |
| *F24C 15/20* | (2006.01) |
| *F24C 15/32* | (2006.01) |
| *H04N 23/52* | (2023.01) |
| *H04N 23/81* | (2023.01) |
| *F24C 7/08* | (2006.01) |

(52) U.S. Cl.
CPC ............ *F24C 15/32* (2013.01); *F24C 15/322* (2013.01); *H04N 23/52* (2023.01); *H04N 23/811* (2023.01); *F24C 7/085* (2013.01); *F24C 15/2007* (2013.01); *F24C 15/2021* (2013.01)

(56) References Cited

U.S. PATENT DOCUMENTS

| | | | | |
|---|---|---|---|---|
| 11,353,219 | B2 | 6/2022 | Iwamoto et al. | |
| 2007/0006865 | A1* | 1/2007 | Wiker | F24C 14/00 126/21 A |
| 2010/0264162 | A1* | 10/2010 | Cratensburg | B67D 7/04 222/129 |
| 2011/0266271 | A1* | 11/2011 | Boyer | F24C 15/00 219/393 |
| 2014/0190521 | A1* | 7/2014 | Fowler | F24C 14/02 134/105 |
| 2018/0070596 | A1* | 3/2018 | Kim | A47J 27/04 |
| 2018/0363917 | A1* | 12/2018 | Lim | F24C 14/02 |
| 2018/0372332 | A1 | 12/2018 | Cha et al. | |
| 2020/0217512 | A1 | 7/2020 | Clayton et al. | |
| 2021/0003289 | A1* | 1/2021 | Iwamoto | F24C 7/087 |
| 2021/0095864 | A1 | 4/2021 | Nakashima et al. | |
| 2021/0285653 | A1 | 9/2021 | Bhogal et al. | |
| 2022/0005401 | A1* | 1/2022 | Kang | G09G 3/20 |

FOREIGN PATENT DOCUMENTS

| | | | | | |
|---|---|---|---|---|---|
| CN | 214348481 | U | 10/2021 | | |
| CN | 111664484 | B | 4/2022 | | |
| DE | 10 2020 126 930 | A1 | 4/2022 | | |
| DE | 102021110574 | A1 * | 10/2022 | | F24C 14/02 |
| EP | 1392083 | A2 * | 2/2004 | | F24C 14/02 |
| EP | 3 608 593 | A1 | 2/2020 | | |
| EP | 3647663 | A1 * | 5/2020 | | G02F 1/0126 |
| EP | 3 667 172 | A1 | 6/2020 | | |
| EP | 3 290 808 | B1 | 11/2020 | | |
| JP | 2020-165572 | | 10/2020 | | |
| JP | 7108831 | | 7/2022 | | |
| KR | 20080044966 | A * | 5/2008 | | H05B 6/6405 |
| KR | 10-2018-0025787 | | 3/2018 | | |
| KR | 10-2021-0003664 | | 1/2021 | | |
| KR | 10-2372170 | | 3/2022 | | |
| WO | WO-2004076928 | A2 * | 9/2004 | | A21B 1/245 |
| WO | WO 2021/184003 | A1 | 9/2021 | | |
| WO | WO-2022078839 | A1 * | 4/2022 | | F24C 7/085 |

OTHER PUBLICATIONS

Espacenet, partial English-language machine translation of WO2022078839 A1 (Year: 2025).*
KIPO, English-language translation of Written Opinion for PCT/KR2023/012421 (Year: 2023).*
International Search Report dated Dec. 14, 2023 issued PCT Application No. PCT/KR2023/012421.
Written Opinion dated Dec. 14, 2023 issued PCT Application No. PCT/KR2023/012421.
Supplementary Partial European Search Report dated Sep. 24, 2025, issued in EP Application No. EP 23 86 3384.
Supplementary European Search Report dated Dec. 15, 2025, issued in EP Application No. EP 23 86 3384.

\* cited by examiner

COOKING APPARATUS AND CONTROL METHOD THEREOF

CROSS-REFERENCE TO RELATED APPLICATION(S)

This application is a by-pass continuation application, under 35 U.S.C. § 111(a), of International Application No. PCT/KR2023/012421, filed on Aug. 22, 2023, which claims priority to Korean Patent Applications No. 10-2022-0113824, filed on Sep. 7, 2022, and No. 10-2023-0015109, filed on Feb. 3, 2023, in the Korean Intellectual Property Office, the disclosure of which is incorporated by reference herein in their entireties

BACKGROUND

1. Field

The disclosure relates to a cooking apparatus including a camera configured to image an inside of a cooking chamber, and a control method thereof.

2. Description of Related Art

In general, a cooking apparatus includes a cooking chamber and a heating device configured to heat the cooking chamber to cook food. The cooking apparatus may include an oven using an electric heater or gas as a heating device and a microwave oven using a magnetron configured to generate microwaves as a heating device.

The cooking apparatus may be equipped with a camera to image an inside of the cooking chamber. The type, state, etc. of food may be ecognized using the installed camera, and the cooking apparatus may be controlled accordingly.

The inside of the cooking chamber may be heated to a high temperature and the camera may be vulnerable to heat. Accordingly, a structure for properly cooling the camera is required to prevent the camera from being damaged or malfunctioning due to high temperature heat.

SUMMARY

The disclosure provides a cooking apparatus including a structure in which a camera is disposed above a cooking chamber to clearly image an inside of the cooking chamber, the structure capable of cooling the camera to prevent a temperature rise of the camera caused by heat generated in the cooking chamber.

The disclosure also provides a cooking apparatus capable of preventing foreign substances such as water and oil from entering through a suction duct used to cool a camera.

The disclosure also provides a cooking apparatus including a cooling structure capable of efficiently cooling a lower portion of a camera close to a cooking chamber.

The disclosure also provides a cooking apparatus including an electronic compartment cooling structure for cooling an entire electronic compartment formed outside a cooking chamber, and a camera cooling structure for intensively cooling a camera.

The disclosure also provides a cooking apparatus capable of efficiently cooling an electronic component such as a circuit board disposed in an electronic compartment.

The disclosure also provides a cooking apparatus capable of preventing a flow of air for cooling a camera from interfering with a flow of air for cooling an entire electronic compartment.

The disclosure also provides a cooking apparatus capable of increasing a viewing angle of a camera by installing the camera to be maximally close to a transparent member of a cooking camber.

The disclosure also provides a cooking apparatus capable of recognizing foreign substances such as dust attached around a camera and removing the foreign substances, and a control method thereof.

The technical problems to be solved herein are not limited to those mentioned above, and other technical problems not mentioned will be apparent to one of ordinary skill in the art from the following description.

In accordance with an embodiment of the disclosure, a cooking apparatus may comprise a case, a cooking chamber formed inside the case, a camera configured to obtain an image inside of the cooking chamber, the camera having a lens, a transparent member disposed in front of the lens of the camera so that the camera obtains the image inside of the cooking chamber through the transparent member, a camera cooling fan configured to blow aft toward the camera, a motor configured to rotate the camera cooling fan, and a controller to be electrically connected to the camera and the motor.

The controller may be further configured to operate the camera to obtain a first image inside of the cooking chamber, identify foreign substance-related information of the lens of the camera or the transparent member based on the obtained first image, and control an operation of the motor to perform a cleaning mode, in which the camera cooling fan is rotated at a first rotation speed for a first rotation time, based on determining that foreign substance is present to at least partially block the lens or the transparent member.

In accordance with another embodiment of the disclosure, a cooking apparatus may comprise a case, a cooking chamber formed inside the case, a door configured to open or close the cooking chamber, a door sensor configured to detect an opening or a closing of the door, a camera configured to obtain an image inside of the cooking chamber, a camera cooling fan configured to blow air toward the camera, a motor configured to rotate the camera cooling fan, and a controller configured to electrically connect to the door sensor and the motor.

The controller may be configured to control an operation of the motor to rotate the camera cooling fan based on the detection of the opening of the door or the closing of the door by the sensor.

In accordance with another embodiment of the disclosure, a control method of a cooking apparatus may comprise operating a camera to obtain a first image inside of a cooking chamber, identifying foreign substance-related information of a lens of the camera or a transparent member of the cooking chamber based on the first image by using a learning model obtained from a memory or a serve, and controlling an operation of a motor to perform a cleaning mode, in which a camera cooling fan is rotated at a first rotation speed for a first rotation time to remove, based on the determining that the foreign substance is present.

BRIEF DESCRIPTION OF THE DRAWINGS

These and/or other aspects of the disclosure will become apparent and more readily appreciated from the following description of embodiments, taken in conjunction with the accompanying drawings of which:

FIG. 3 is a longitudinal cross-sectional view of the cooking apparatus according to an embodiment of the disclosure;

FIG. 16 is a flowchart illustrating a control method of the cooking apparatus according to an embodiment of the disclosure;

DETAILED DESCRIPTION

Figure 1:
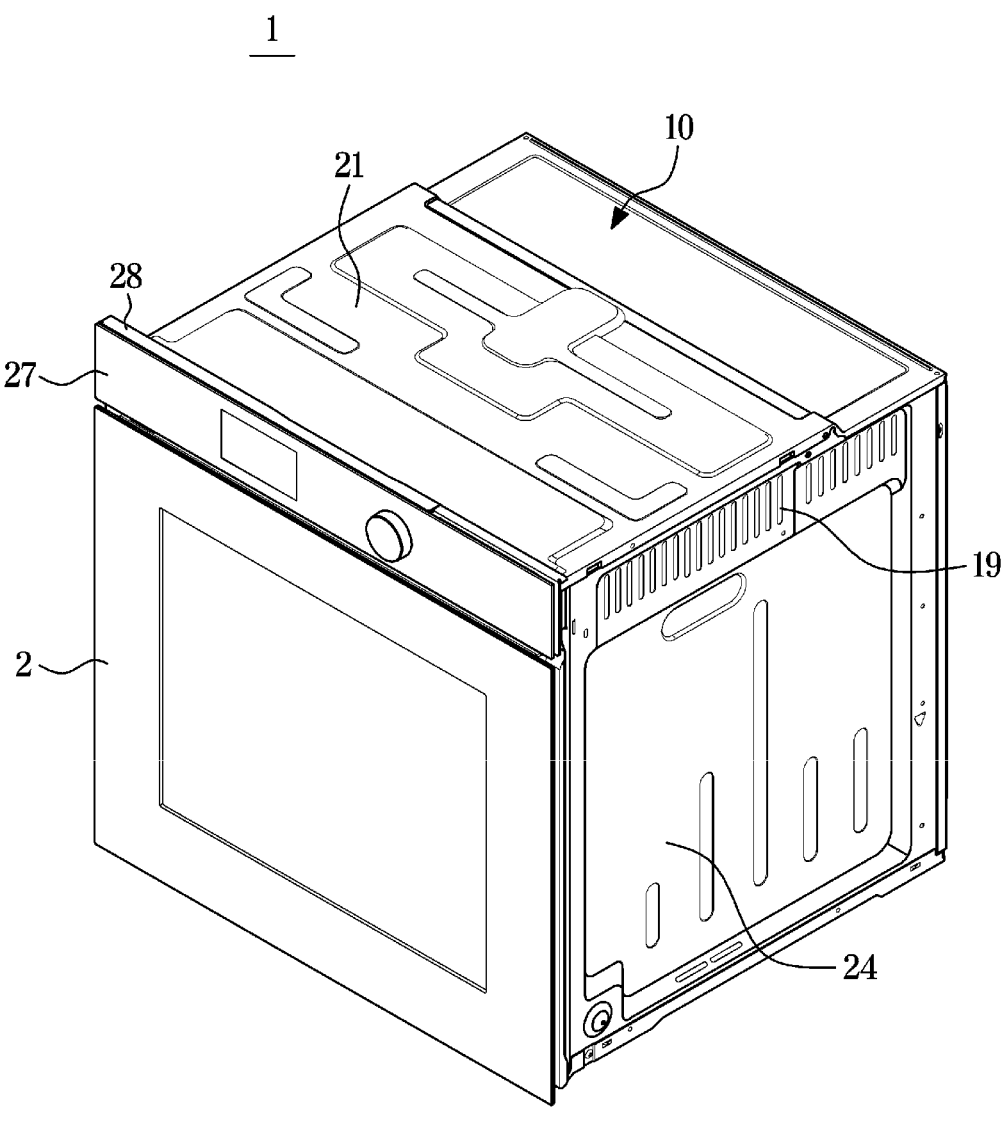
FIG. 1 is a view illustrating an appearance of a cooking apparatus according to an embodiment of the disclosure.

The various embodiments and the terms used therein are not intended to limit the technology disclosed herein to specific forms, and the disclosure should be understood to include various modifications, equivalents, and/or alternatives to the corresponding embodiments.

In describing the drawings, similar reference numerals may be used to designate similar constituent elements.

A singular expression may include a plural expression unless they are definitely different in a context.

The expressions "A or B," "at least one of A or/and B," or "one or more of A or/and B," A, B or C," "at least one of A, B or/and C," or "one or more of A, B or/and C," and the like used herein may include any and all combinations of one or more of the associated listed items.

For example, the expression "at least one of A, B and C" may include any of the following: A, B, C, A and B, A and C, B and C, A and B and C.

The term of "and/or" includes a plurality of combinations of relevant items or any one item among a plurality of relevant items.

Herein, the expressions "a first", "a second", "the first", "the second", etc., may simply be used to distinguish an element from other elements, but is not limited to another aspect (importance or order) of elements.

When an element (e.g., a first element) is referred to as being "(functionally or communicatively) coupled," or "connected" to another element (e.g., a second element), the first element may be connected to the second element, directly (e.g., wired), wirelessly, or through a third element.

In this disclosure, the terms "including", "having", and the like are used to specify features, numbers, steps, operations, elements, elements, or combinations thereof, but do not preclude the presence or addition of one or more of the features, elements, steps, operations, elements, elements, or combinations thereof.

When an element is said to be "connected", "coupled", "supported" or "contacted" with another element, this includes not only when elements are directly connected, coupled, supported or contacted, but also when elements are indirectly connected, coupled, supported or contacted through a third element.

Throughout the description, when an element is "on" another element, this includes not only when the element is in contact with the other element, but also when there is another element between the two elements.

Reference will now be made in detail to embodiments of the disclosure, examples of which are illustrated in the accompanying drawings.

Figure 2:
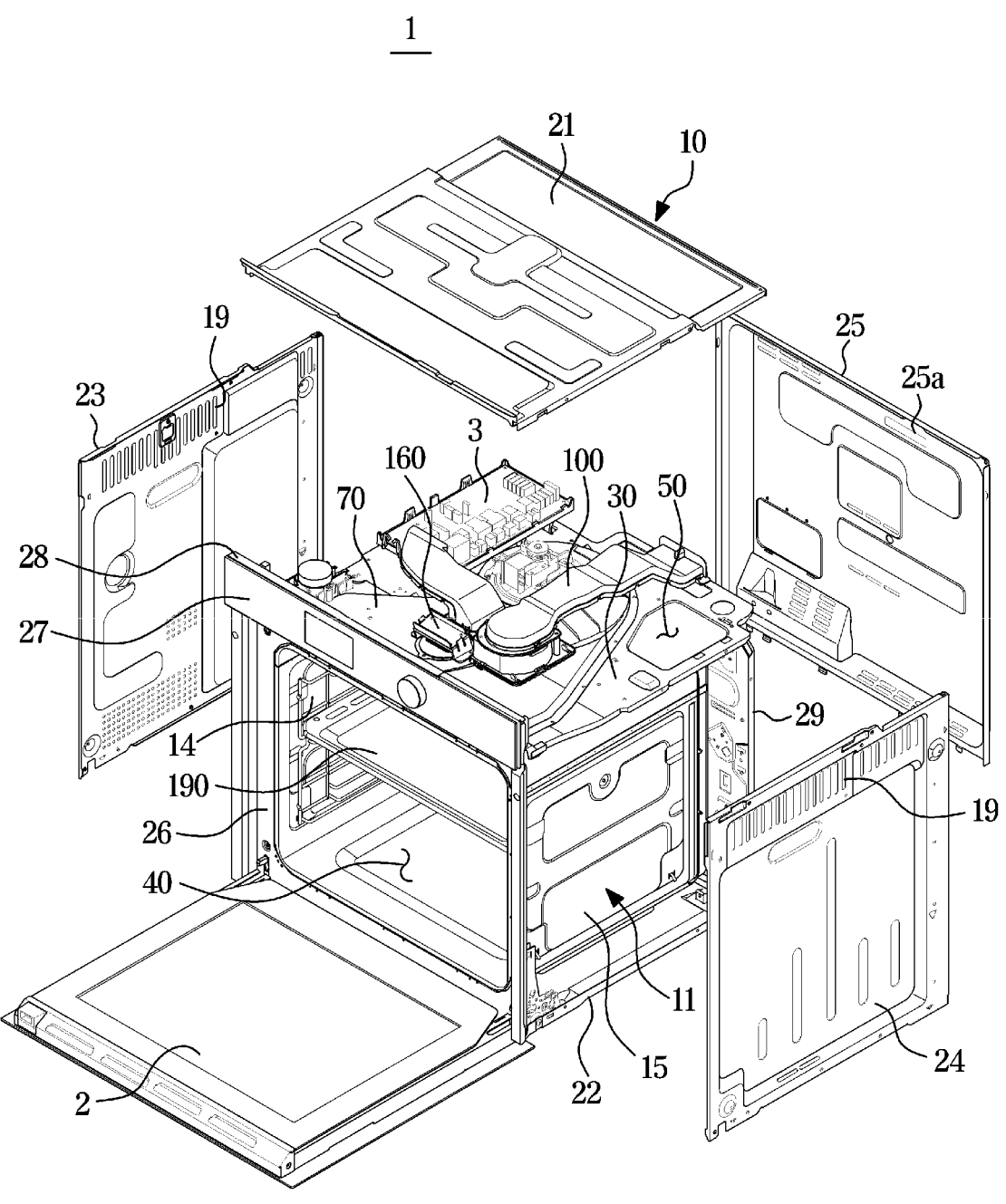
FIG. 2 is an exploded view illustrating an outer case of the cooking apparatus according to an embodiment of the disclosure.
Figure 3:
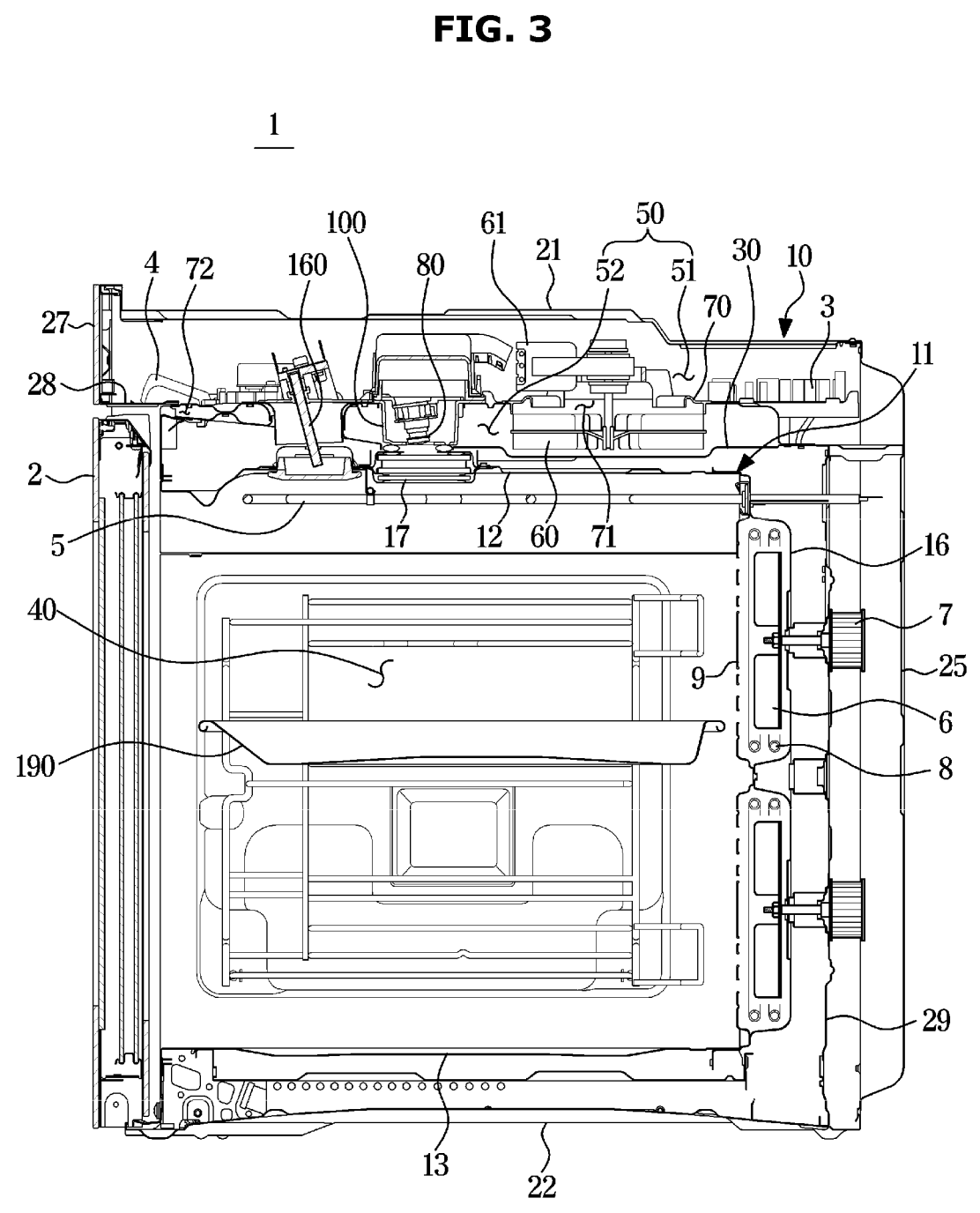
Figure 4:
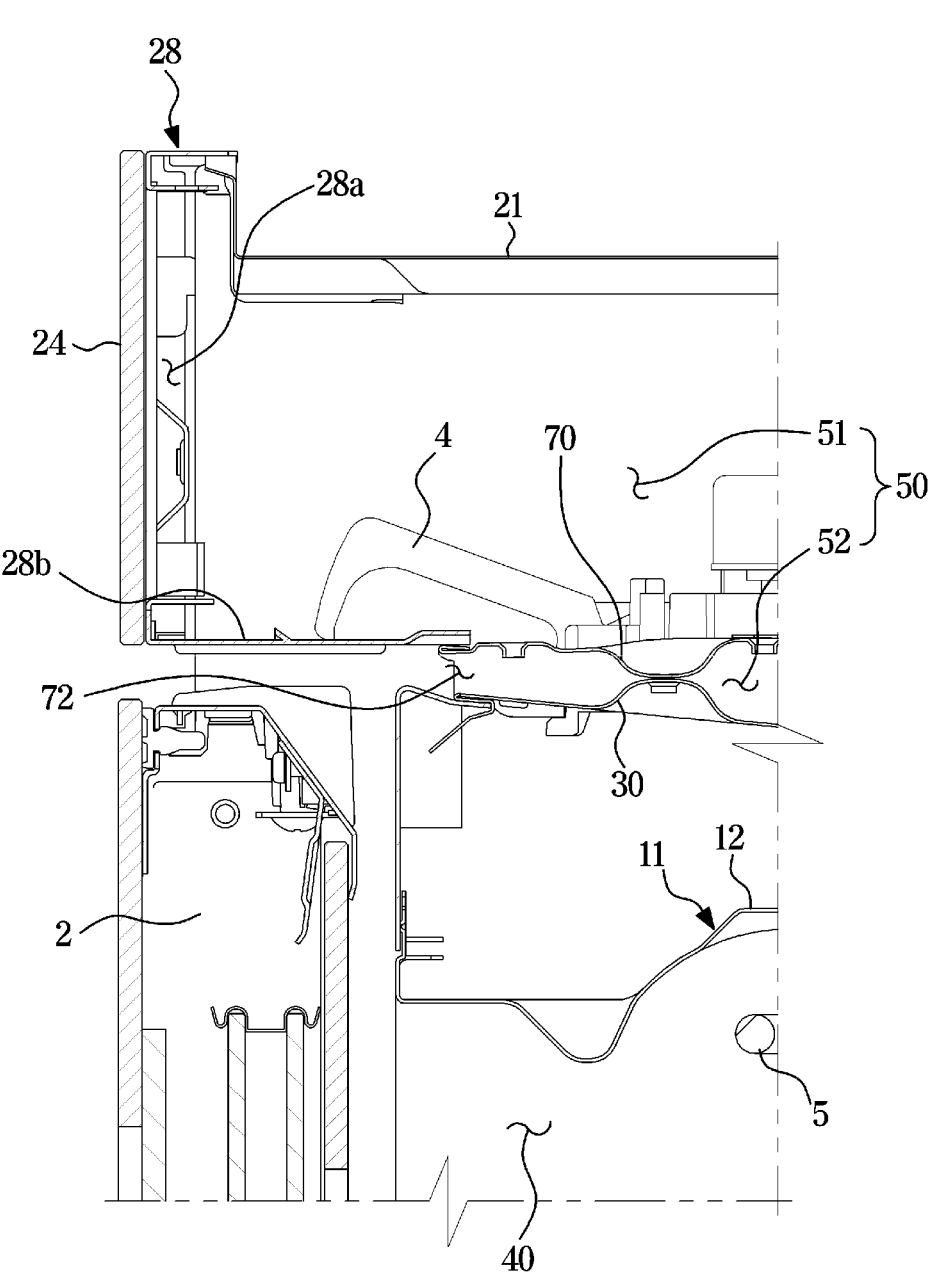
FIG. 4 is a cross-sectional view illustrating a front upper portion of the cooking apparatus according to an embodiment of the disclosure.

FIG. 1 is a view illustrating an appearance of a cooking apparatus according to an embodiment of the disclosure. FIG. 2 is an exploded view illustrating an outer case of the cooking apparatus according to an embodiment of the disclosure. FIG. 3 is a longitudinal cross-sectional view of the cooking apparatus according to an embodiment of the disclosure. FIG. 4 is a cross-sectional view illustrating a front upper portion of the cooking apparatus according to an embodiment of the disclosure.

As illustrated in FIGS. 1 to 4, the cooking apparatus 1 may include a main body 10 including an inner case 11, a cooking chamber 40 formed inside the inner case 11, and an electronic compartment 50 formed outside the inner case 11.

The inner case 11 may define the cooking chamber 40 and the electronic compartment 50. The inner case 11 may have a substantially box shape. The inner case 11 may include an upper wall 12, a lower wall 13, a left wall 14, a right wall 15, and a rear wall 16.

The cooking chamber 40 may cook food at a high temperature. The cooking chamber 40 may be formed in such a way that a front side is opened to take in and out of food. Heating devices 5 and 8 may be provided in the cooking chamber 40 to heat the cooking chamber 40. The heating devices 5 and 8 may include an electric heater including a heating element and configured to generate heat when electricity is supplied. However, the heating devices 5 and 8 are not limited thereto, and may include a gas burner configured to generate heat using gas or a magnetron configured to generate microwaves.

The heating devices 5 and 8 may include an upper heating device 5 and a fan heating device 8. The upper heating device 5 may be disposed in an upper portion of the cooking chamber 40 to heat the food from an upper side of the food. The fan heating device 8 may be disposed around a convection fan 6 configured to allow convention of the air inside the cooking chamber 40.

According to embodiments, the cooking apparatus 1 may include at least one of the upper heating device 5 and the fan heating device 8. In addition, the cooking apparatus 1 may further include a lower heating device provided in a lower portion of the cooking chamber 40.

The convection fan 6 for convection of air inside the cooking chamber 40 may be provided in the cooking chamber 40. The convection fan 6 may be disposed at the rear of the cooking chamber 40. The convection fan 6 may be covered and protected by a fan cover 9. The fan cover 9 may be coupled to the rear wall 16 of the inner case 11. A through-hole may be formed in the fan cover 9 to allow air to flow. The convection fan 6 may be driven by a convection fan motor 7. The convection fan motor 7 may be supported on a support plate 29 disposed between the rear wall 16 of the inner case 11 and a rear plate 25 of the outer case.

A shelf 190 on which food to be cooked is placed may be disposed in the cooking chamber 40.

Various electronic components such as a circuit board 3 configured to control an operation of the cooking apparatus 1 may be arranged in the electronic compartment 50. According to embodiments, a steam generator (not shown) configured to generate steam may be provided in the electronic compartment 50.

According to embodiments, an automatic opening and closing device (not shown) configured to automatically open and close a door 2 may be provided in the electronic compartment 50.

The electronic compartment 50 may be formed to surround the cooking chamber 40. The electronic compartment 50 may insulate between the cooking chamber 40 and an outer case of the main body 10 to prevent heat inside the cooking chamber 40 from being discharged to the outside of the main body 10 as it is. Air may flow in the electronic compartment 50 for insulation. A separate insulating material (not shown) may be provided in the electronic compartment 50 to surround the inner case 11 for insulation. The insulating material may be formed of glass fiber, asbestos, or the like.

The main body 10 may include the outer case forming an exterior of the cooking apparatus 1. The inner case 11 may be received inside the outer case. The electronic compartment 50 may be formed between the inner case 11 and the outer case. The outer case may include an upper plate 21, a lower plate 2, a left plate 23, a right plate 24, the rear plate 25, and a front plate 26. A through-hole 19 through which air flows into the electronic compartment 50 may be formed in the left plate 23, the right plate 24, the rear plate 25, and the like. According to embodiments, the through-hole 19 may also be formed in the upper plate 21 or the lower plate 22.

The cooking apparatus 1 may include a control panel 27. The control panel 27 may include a display configured to display various operation information of the cooking apparatus 1 and an inputter through which a user can input operation commands. The inputter may include a touch panel. The inputter may include a button or a knob.

The control panel 27 may be provided on a front upper portion of the cooking apparatus 1. The control panel 27 may be mounted on a panel bracket 28 coupled to the main body 10. The control panel 27 may be mounted on a front surface of the panel bracket 28. The panel bracket 28 may include a bracket opening 28a to allow at least a portion of a rear surface of the control panel 27 to be cooled by an electronic compartment cooling fan 60. A bottom member 28b of the panel bracket 28 may be positioned in front of an electronic compartment duct 70 to be a height corresponding to an upper surface of the electronic compartment duct 70. The bottom member 28b of the panel bracket 28 may guide air discharged toward the front of the main body 10 through a discharge port 72 of the electronic compartment duct 70.

The cooking apparatus 1 may include a door 2 provided on the front surface of the main body 10 to open and close the cooking chamber 40. The door 2 may be rotatably provided on the front surface of the main body 10. The door 2 may be provided to be opened and closed while rotating in an up and down direction with respect to a lower end.

A locking device 4 configured to lock the door 2 while the door 2 is closed may be provided in the electronic compartment 50.

The cooking apparatus 1 may include a base plate 30 provided in the electronic compartment 50 to allow various components of the electronic compartment 50 to be installed. The base plate 30 may be provided above the inner case 11 to be spaced apart from the inner case 11 by a predetermined distance. The insulating material (not shown) may be provided or an air heat insulating layer may be formed between the base plate 30 and the upper wall 12 of the inner case 11.

The electronic compartment duct 70 may be coupled to an upper surface of the base plate 30. The electronic compartment duct 70 may divide the electronic compartment 50 into an electronic component space 51 and an exhaust space 52. The exhaust space 52 may be formed between the electronic compartment duct 70 and the base plate 30. The base plate 30 may include a plate opening 31 formed to allow a camera 80 to image the cooking chamber 40. The plate opening 31 may be formed at a position corresponding to a transparent member 17 provided on the upper wall 12 of the inner case 11.

The electronic compartment duct 70 may include a suction port 71 through which air is sucked from the electronic component space 51 to the exhaust space 52. The electronic compartment duct 70 may include the discharge port 72 configured to discharge air in the exhaust space 52 to the outside of the electronic compartment duct 70. Air in the electronic compartment 50 may be discharged to the outside of the main body 10 through the electronic compartment duct 70. The discharge port 72 may be formed in front of the electronic compartment duct 70. Thus, air in the electronic compartment 50 may be discharged to the front of the main body 10.

The electronic compartment duct 70 may include a housing duct opening 73 through which a housing 110 of a camera cooling duct 100 passes, and a lighting duct opening 74 through which a lighting device 160 passes.

The cooking apparatus 1 may include the electronic compartment cooling fan 60 configured to cool the electronic compartment 50. The electronic compartment cooling fan 60 may be driven by an electronic compartment cooling fan motor 61. The electronic compartment cooling fan motor 61 may be mounted on a motor mount 75 coupled to the electronic compartment duct 70. The electronic compartment cooling fan 60 may cool the electronic compartment 50 by moving air inside the electronic compartment 50.

The electronic compartment cooling fan 60 may be provided in the electronic compartment 50. The electronic compartment cooling fan 60 may be disposed adjacent to the suction port 71 of the electronic compartment duct 70. The electronic compartment cooling fan 60 may include a centrifugal fan configured to suck air in an axial direction and discharge the air in a radial direction.

The electronic compartment cooling fan 60 may suck air from the outside of the main body 10 into the electronic compartment 50 through the through-hole 19 formed in the left plate 23, the right plate 24, and the rear plate 25. The electronic compartment cooling fan 60 may cool the entire electronic compartment 50 by forming air flow throughout the electronic compartment 50.

When the electronic compartment cooling fan 60 operates, the air outside the main body 10 may be sucked into the electronic compartment space 51 of the electronic compartment 50, and the air in the electronic compartment space 51 may be sucked into the exhaust space 52 formed by the electronic compartment duct 70. Air in the exhaust space 52 may be discharged toward the front of the main body 10.

The cooking apparatus 1 may include the camera 80 configured to image the inside of the cooking chamber 40. The camera 80 may be disposed in the electronic compartment 50. The camera 80 may image the inside of the cooking chamber 40 through the upper wall 12 of the inner case 11. For this, the upper wall 12 of the inner case 11 may include the transparent member 17 through which the camera 80 sees through. The camera 80 may be disposed above the transparent member 17 and may image the inside of the cooking chamber 40 through the transparent member 17.

The cooking apparatus 1 may include the lighting device 160 to brightly illuminate the cooking chamber 40 when the camera 80 images the cooking chamber 40. The lighting device 160 may be disposed in front of the camera 80. The lighting device 160 may be installed to penetrate the electronic compartment duct 70 and the base plate 30. The lighting device 160 may include a light source such as a light emitting diode (LED) and a light guide plate provided to guide light emitted from the light source.

The cooking apparatus 1 may include a camera cooling fan 90 (refer to FIG. 8) configured to intensively cool the camera 80.

The cooking apparatus 1 may include the camera cooling duct 100 configured to, when the camera cooling fan 90 is driven, allow air outside the main body 10 to be sucked to cool the camera 80 and to be discharged to the electronic component space 51 of the electronic compartment 50.

Figure 5:
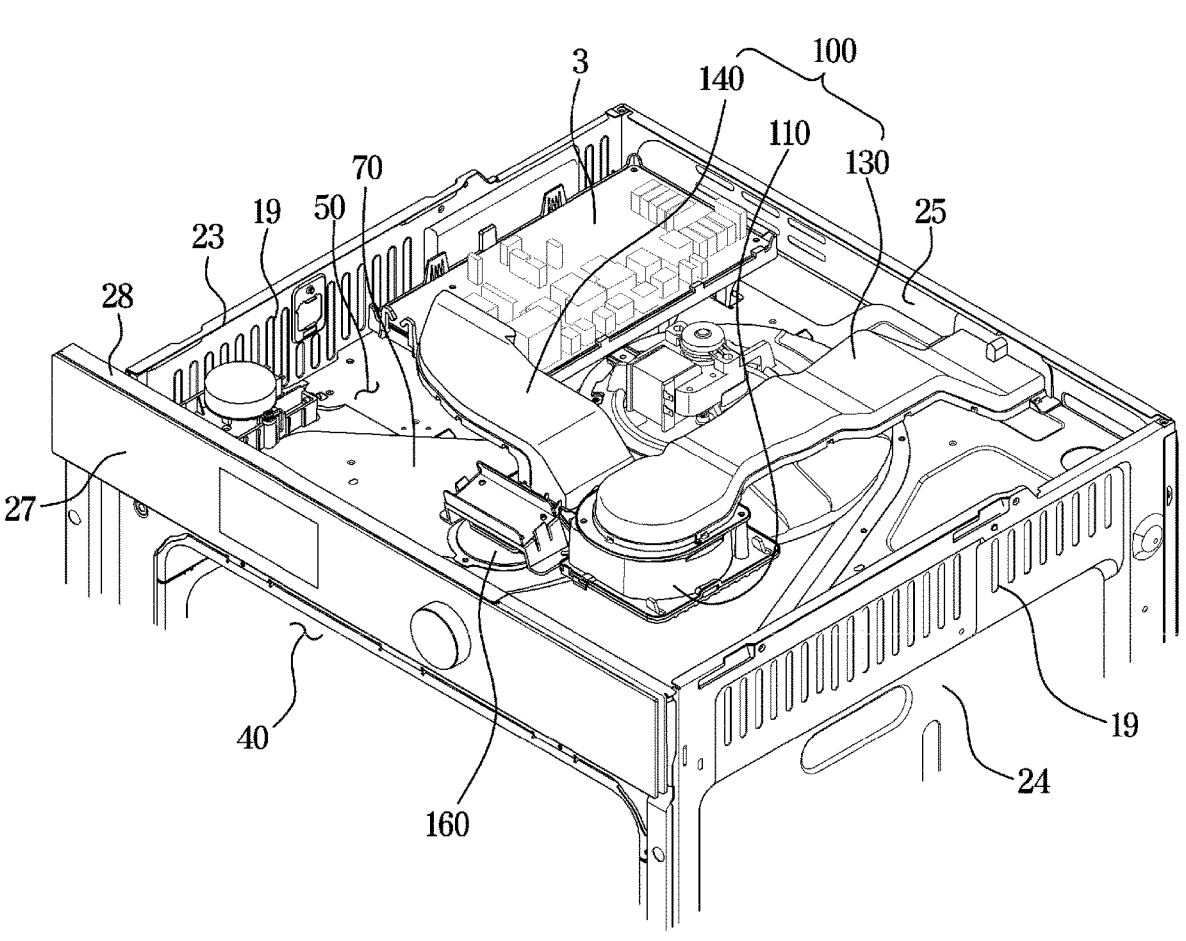
FIG. 5 is a view illustrating a state in which an upper plate of the cooking apparatus according to an embodiment of the disclosure is removed.
Figure 6:
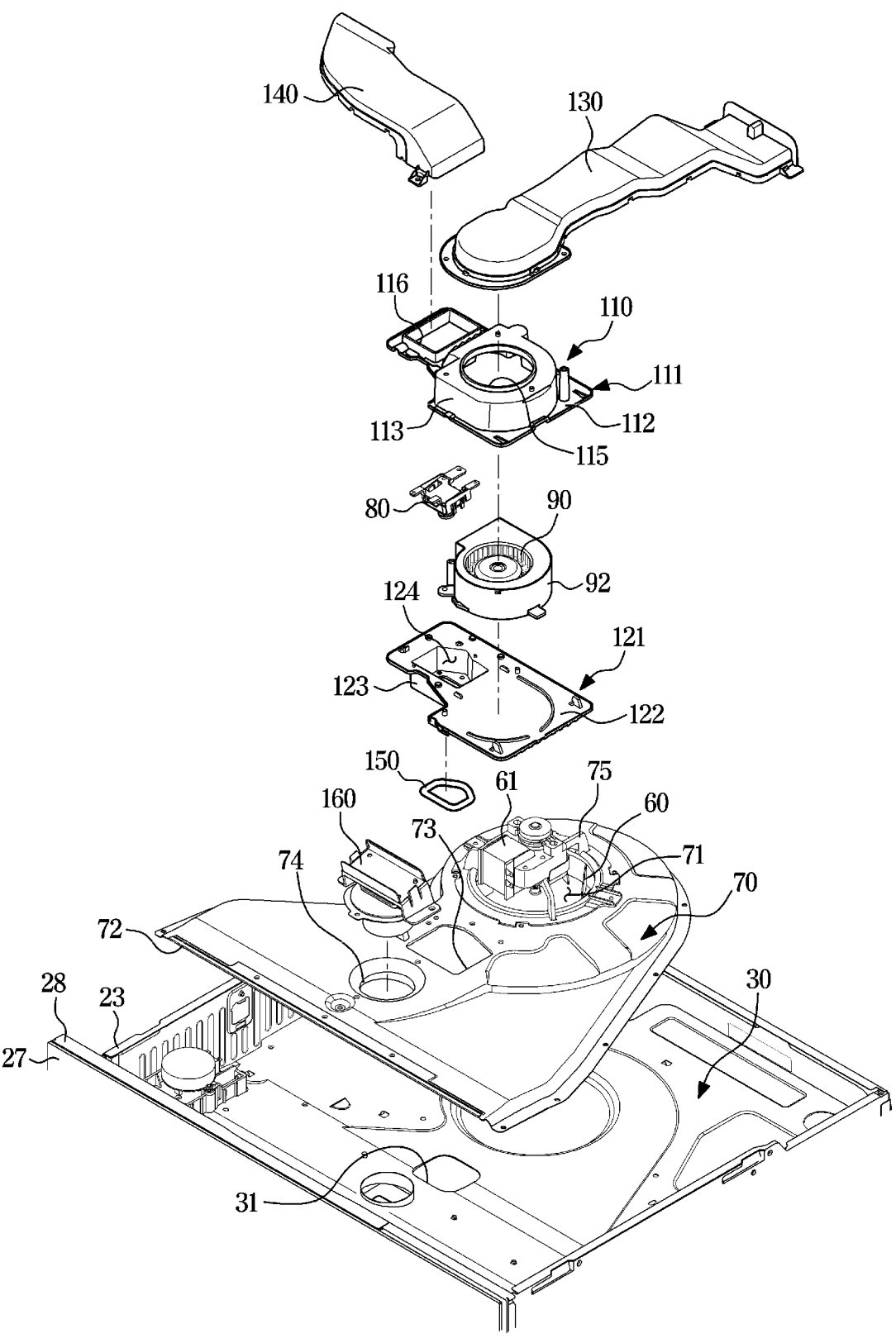
FIG. 6 is an exploded view illustrating main components of a camera cooling duct according to an embodiment of the disclosure.
Figure 7:
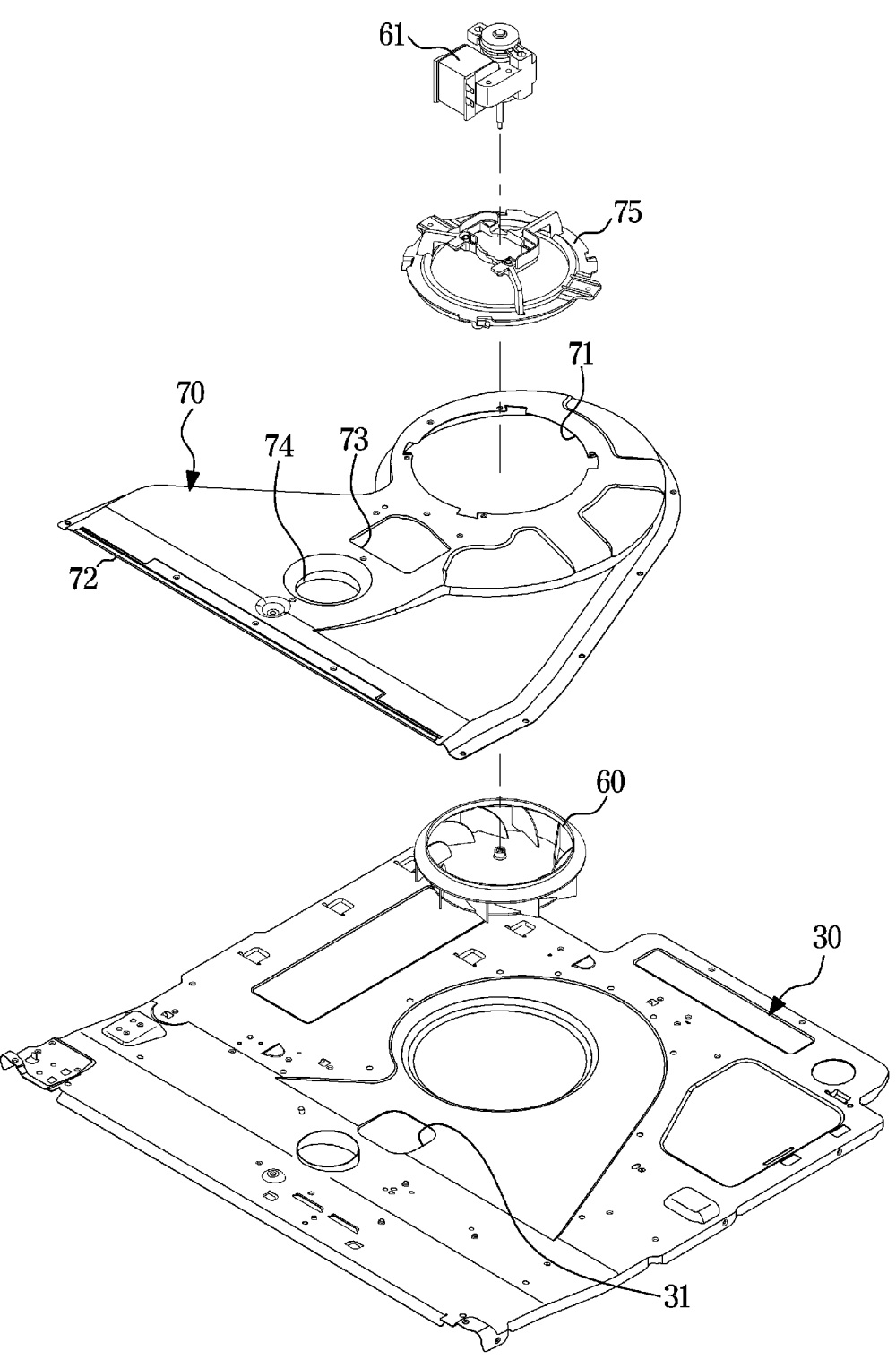
FIG. 7 is a view illustrating an electronic compartment cooling fan and an electronic compartment cooling duct according to an embodiment of the disclosure.
Figure 8:
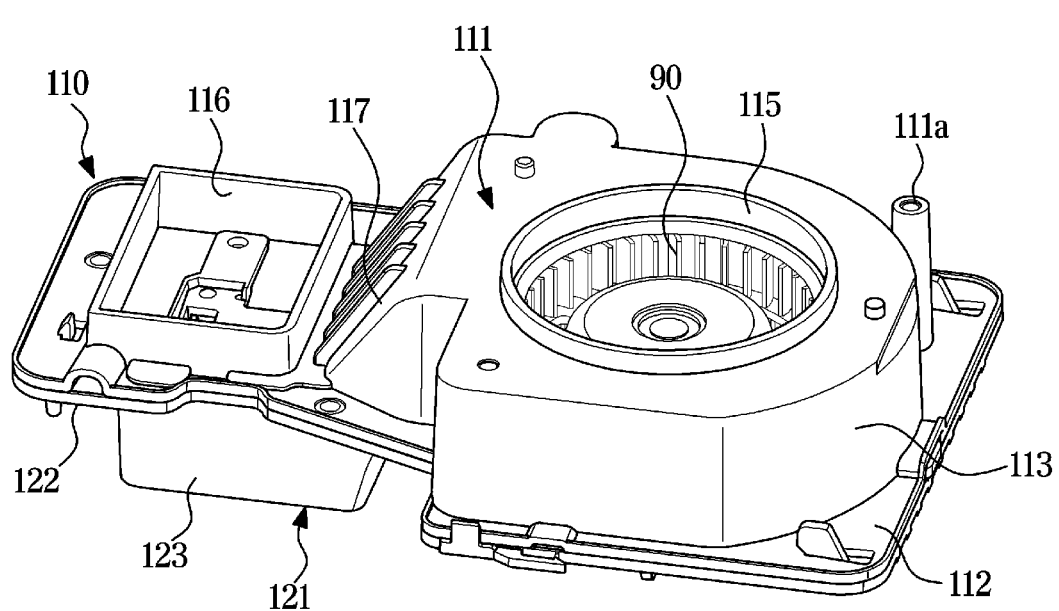
FIG. 8 is a view illustrating a housing of a camera cooling duct according to an embodiment of the disclosure.
Figure 9:
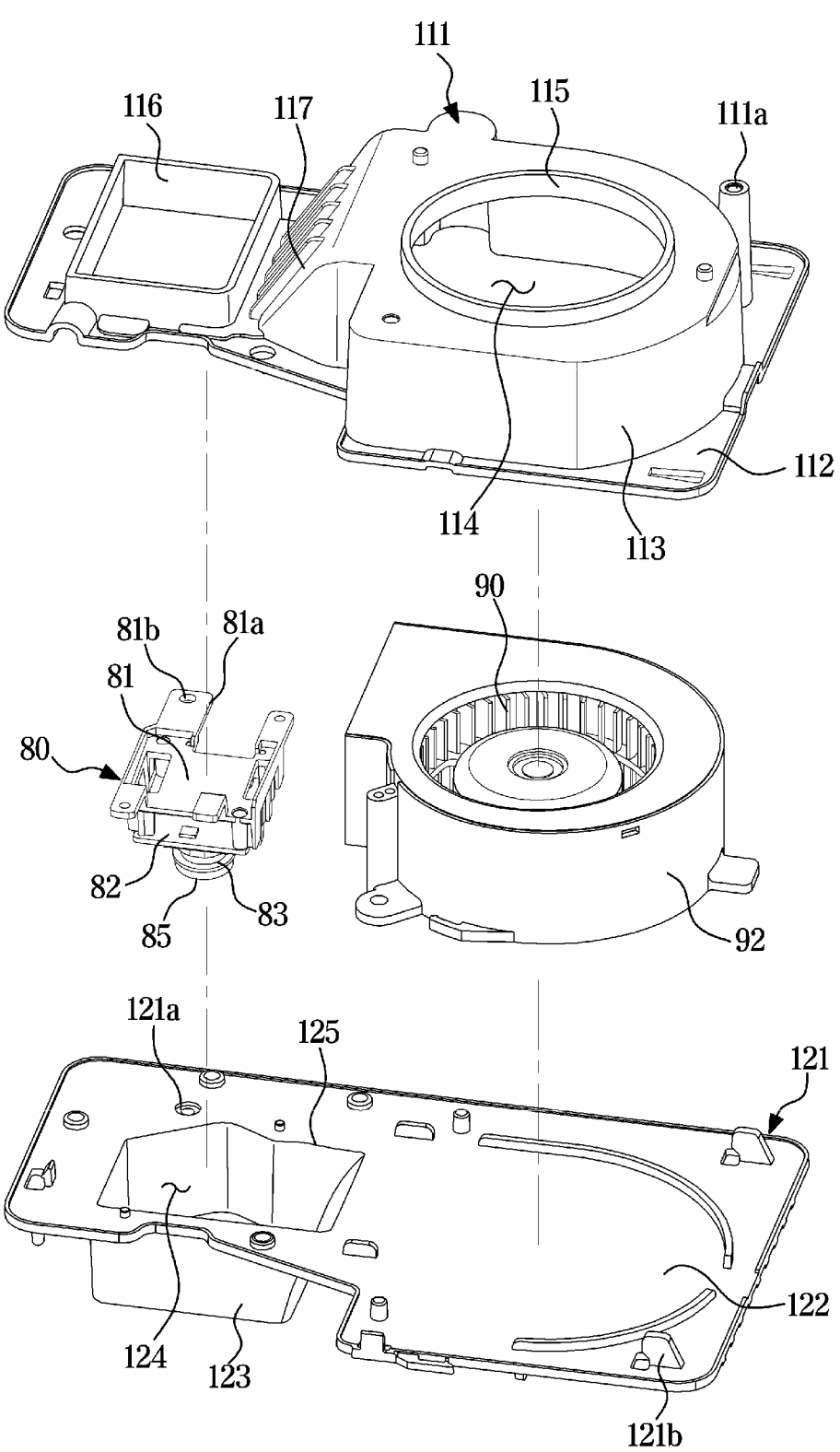
FIG. 9 is an exploded view illustrating the housing of the camera cooling duct according to an embodiment of the disclosure.
Figure 10:
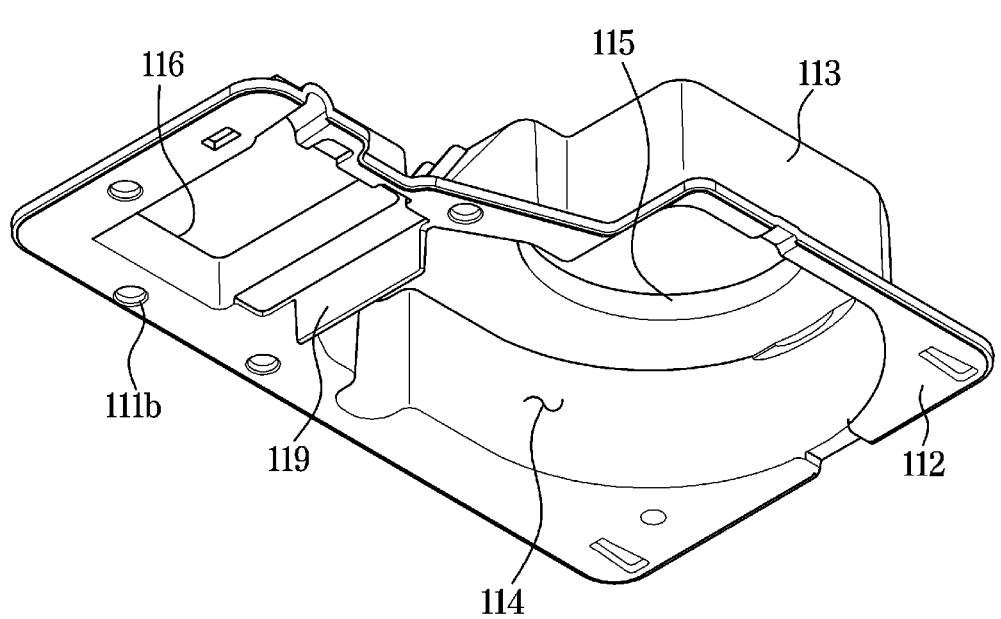
FIG. 10 is a perspective view illustrating a lower surface of an upper housing of the housing according to an embodiment of the disclosure.
Figure 11:
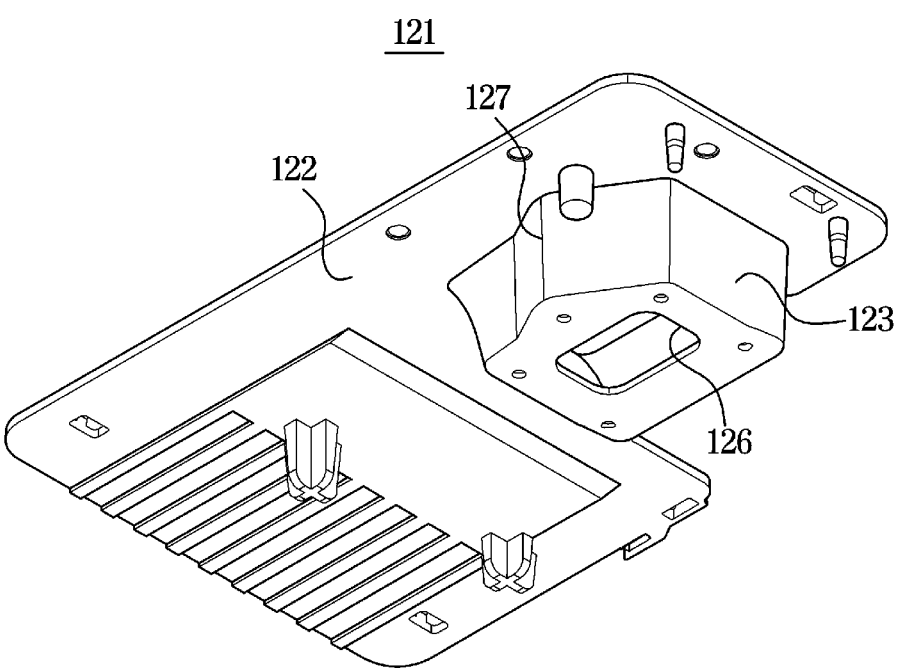
FIG. 11 is a perspective view illustrating a lower surface of a lower housing of the housing according to an embodiment of the disclosure.
Figure 12:
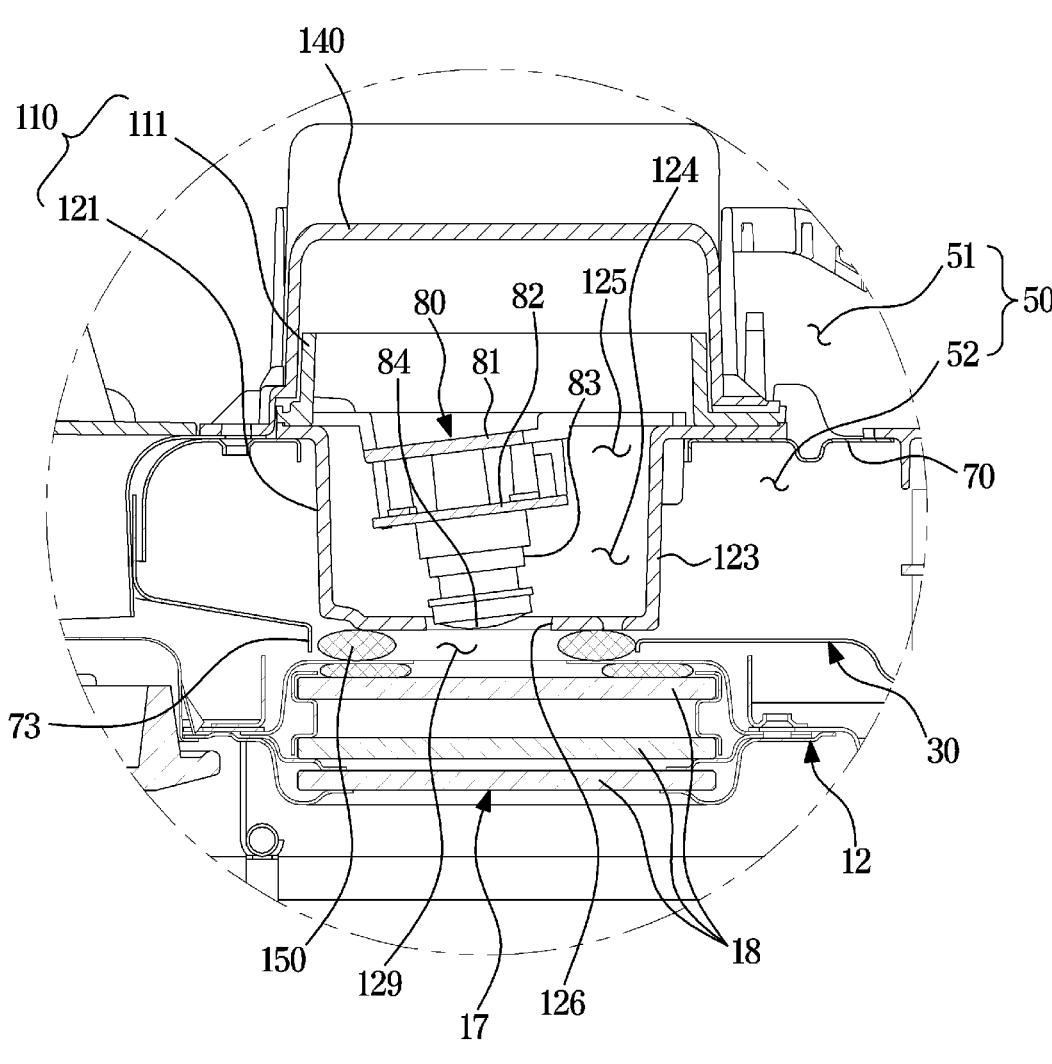
FIG. 12 is a cross-sectional view illustrating a vicinity of a camera of the cooking apparatus according to an embodiment of the disclosure, particularly, a cross-sectional view taken along a front and rear direction of a main body.
Figure 13:
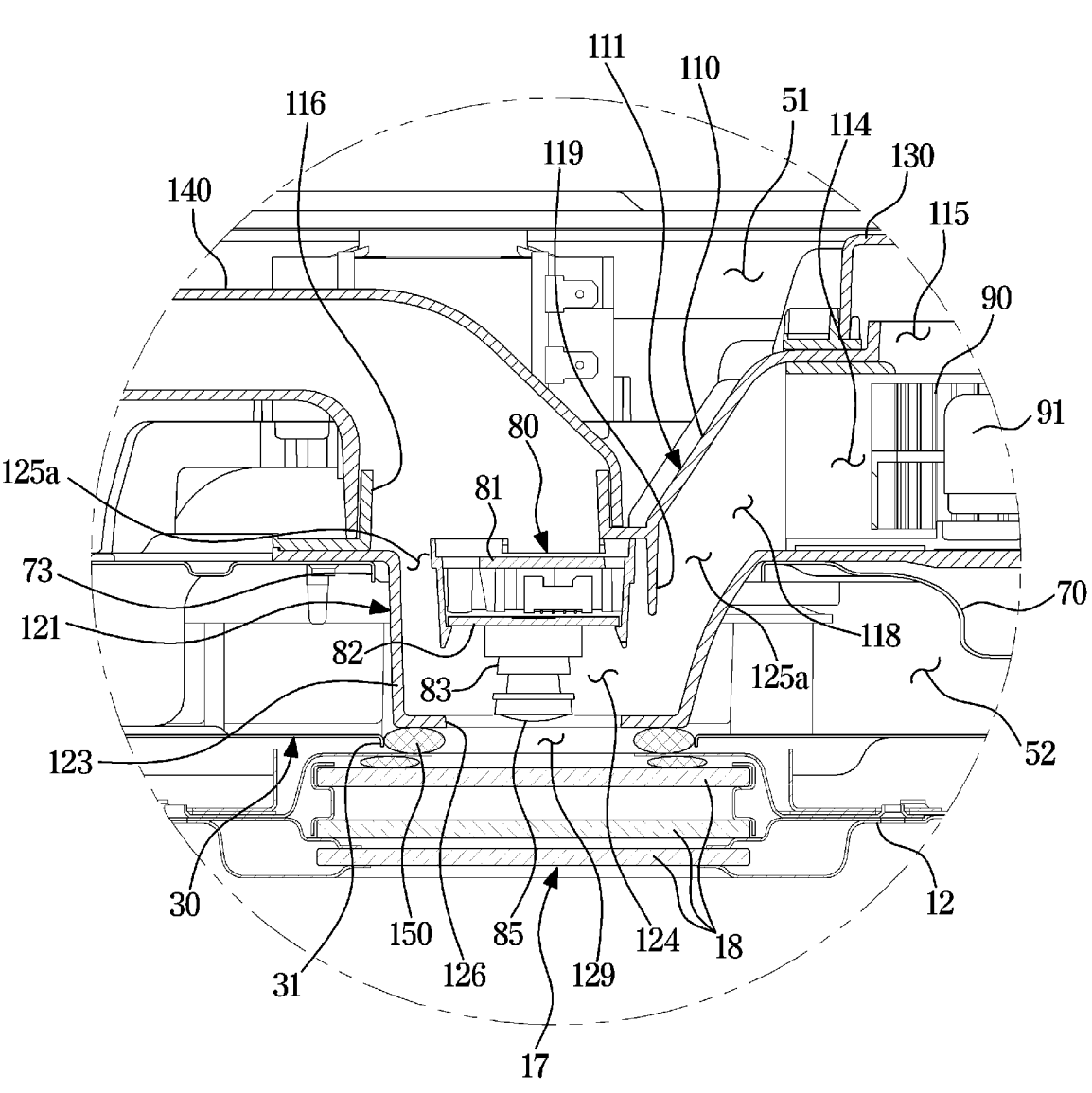
FIG. 13 is a cross-sectional view illustrating the vicinity of the camera of the cooking apparatus according to an embodiment of the disclosure, particularly, a cross-sectional view taken along a left and right direction of the main body.

FIG. 5 is a view illustrating a state in which an upper plate of the cooking apparatus according to an embodiment of the disclosure is removed. FIG. 6 is an exploded view illustrating main components of a camera cooling duct according to an embodiment of the disclosure. FIG. 7 is a view illustrating an electronic compartment cooling fan and an electronic compartment cooling duct according to an embodiment of the disclosure. FIG. 8 is a view illustrating a housing of a camera cooling duct according to an embodiment of the disclosure. FIG. 9 is an exploded view illustrating the housing of the camera cooling duct according to an embodiment of the disclosure. FIG. 10 is a perspective view illustrating a lower surface of an upper housing of the housing according to an embodiment of the disclosure. FIG. 11 is a perspective view illustrating a lower surface of a lower housing of the housing according to an embodiment of the disclosure. FIG. 12 is a cross-sectional view illustrating a vicinity of a camera of the cooking apparatus according to an embodiment of the disclosure, particularly, a cross-sectional view taken along a front and rear direction of a main body. FIG. 13 is a cross-sectional view illustrating the vicinity of the camera of the cooking apparatus according to an embodiment of the disclosure, particularly, a cross-sectional view taken along a left and right direction of the main body.

As illustrated in FIGS. 5 to 13, the camera cooling duct 100 may include the housing 110, a suction duct 130 coupled to one side of the housing 110, and a discharge duct 140 coupled to the other side of the housing 110. According to embodiments, the housing 110, the suction duct 130, and the discharge duct 140 may be formed separately and assembled with each other. According to embodiments, the housing 110, the suction duct 130, and the discharge duct 140 may be integrally formed with each other.

The housing 110 may include a camera receiving space 124 provided to receive the camera 80 and a cooling fan receiving space 114 provided to receive the camera cooling fan 90. The suction duct 130 may be coupled to the housing 110 to suck air outside the main body 10 and guide the air to the camera receiving space 124. The discharge duct 140 may be coupled to the housing 110 to discharge air from the camera receiving space 124 of the housing 110 to the electronic component space 51 of the electronic compartment 50.

However, according to embodiments, the discharge duct 140 may be omitted. In this case, air in the camera receiving space 124 of the housing 110 may be directly discharged from the housing 110 to the electronic component space 51.

The housing 110 may be coupled to an upper surface of the electronic compartment duct 70. An inlet 115 through which air flows into the housing 110 and an outlet 116 through which air flows out of the inside of the housing 110 may be formed on an upper surface of the housing 110. An exit 137 (refer to FIG. 14) of the suction duct 130 may be connected to the inlet 115. An entrance 144 (refer to FIG. 15) of the discharge duct 140 may be connected to the outlet 116.

The housing 110 may be formed by combining an upper housing 111 and a lower housing 121. The upper housing 111 may include an upper housing base 112, and the lower housing 121 may include a lower housing base 122 coupled to the upper housing base 112. A coupling protrusion 121b of the lower housing base 122 may be inserted into the upper housing base 112 to allow the upper housing 111 and the lower housing 121 to be coupled to each other. However, the coupling method is not limited thereto and the upper housing 111 and the lower housing 121 may be coupled to each other by various other coupling methods.

However, unlike the embodiment, the housing 110 may be integrally formed.

The above-described inlet 115 and outlet 116 may be formed in the upper housing 111. The upper housing 111 may include a cooling fan receiving member 113 protruding upward from the upper housing base 112 to form a cooling fan receiving space 114. The cooling fan receiving space 114 may be formed inside the cooling fan receiving member 113. That is, the cooling fan receiving member 113 may be formed to surround the cooling fan receiving space 114.

The camera cooling fan 90, a camera cooling fan motor 91 configured to drive the camera cooling fan 90, and a fan case 92, in which the camera cooling fan 90 is mounted, may be received in the cooling fan receiving space 114. The camera cooling fan 90 may include a centrifugal fan configured to suck air in an axial direction and discharge the air in a radial direction. The cooling fan receiving space 114 may be located below the inlet 115.

The suction duct 130 may be coupled to the upper housing 111. For this, a suction duct coupler 111a may be formed in the upper housing 111. The discharge duct 140 may be coupled to the upper housing 111. For this, a discharge duct coupler 111b may be formed in the upper housing 111.

The lower housing 121 may include a camera receiving member 123 protruding downward from the lower housing base 122 to form the camera receiving space 124. The camera receiving member 123 may pass through the housing duct opening 73 of the electronic compartment duct 70. The camera receiving member 123 may pass through the housing duct opening 73 of the electronic compartment duct 70 and be disposed in the exhaust space 52 inside the electronic compartment duct 70.

The camera receiving space 124 may be formed inside the camera receiving member 123. That is, the camera receiving member 123 may be formed to surround the camera receiving space 124.

The lower housing base 122 may be located on the upper surface of the electronic compartment duct 70, and the camera receiving member 123 may protrude downward toward the exhaust space 52 of the electronic compartment duct 70. Accordingly, the camera receiving space 124 formed inside the camera receiving member 123 may be located at a height corresponding to the exhaust space 52. The camera receiving space 124 may be located below the outlet 116.

The camera 80 may be coupled to the lower housing 121 to be disposed in the camera receiving space 124. The camera 80 may be coupled to the lower housing base 122. For this, a coupling hole 121a may be formed in the lower housing base 122.

The camera 80 may include a camera substrate 82 including an image sensor, a barrel 83 extending downward from the camera substrate 82 and having a cylindrical shape, a lens 85 disposed at an end of the barrel 83, and a camera bracket 81 provided to mount the camera 80 to the housing 110.

The camera bracket 81 may be coupled to the lower housing 121. The camera bracket 81 may include a camera coupler 81a protruding laterally toward the lower housing base 122, and a camera coupling hole 82b formed in the camera coupler 81a. The camera coupling hole 82b of the camera 80 and the coupling hole 121a of the lower housing base 122 may be coupled through a separate fastening member such as a screw, pin, bolt, or rivet.

The camera receiving space 124 may be located downstream of the cooling fan receiving space 114 in the direction of air flow. That is, air introduced into the housing 110 through the inlet 115 may flow into the camera receiving space 124 via the cooling fan receiving space 114. Air introduced into the camera receiving space 124 may cool the camera 80 and exit through the outlet 116.

A connection flow path 118 provided to guide air of the cooling fan receiving space 114 to the camera receiving space 124 may be formed in the upper housing 111.

The camera receiving space 124 and the cooling fan receiving space 114 may be horizontally and vertically spaced apart from each other. That is, the cooling fan receiving space 114 may be disposed above the camera receiving space 124. As described above, the camera receiving space 124 may be formed at a height corresponding to the exhaust space 52, and the cooling fan receiving space 114 may be formed at a higher position than the exhaust space 52.

The camera receiving space 124 and the cooling fan receiving space 114 may be arranged along the left and right direction of the main body 10. In this embodiment, the camera receiving space 124 may be disposed on the left side of the cooling fan receiving space 114, but according to embodiments, the camera receiving space 124 may be disposed on the right side of the cooling fan receiving space 114.

Because the camera receiving space 124 and the cooling fan receiving space 114 are horizontally and vertically spaced apart from each other, the connection flow path 118 connecting the camera receiving space 124 and the cooling fan receiving space 114 may be formed to be inclined. The upper housing 111 may include an inclined surface 117 to allow the connection flow path 118 to be inclined therein.

The lower housing 121 may include an upper opening 125 formed in an upper portion of the camera receiving space 124. Air may flow into the camera receiving space 124 through the upper opening 125, and air may flow out of the camera receiving space 124 through the upper opening 125. That is, the camera receiving space 124 may include an upper suction and upper discharge structure.

The upper housing 111 may include a guide rib 119 provided to divide the upper opening 125 into one area 125a (refer to FIG. 13) and other area 125b (refer to FIG. 13). The guide rib 119 may protrude downward toward the upper opening 125 from an upper inner surface of the upper housing 111. The guide rib 119 may be formed between the connection flow path 118 and the upper opening 125.

By the guide rib 119, air in the cooling fan receiving space 114 may be introduced into the camera receiving space 124 through the area 125a of the upper opening 125 and the air in the camera receiving space 124 may flow out of the camera receiving space 124 through the other area 125b of the upper opening 125.

In addition, the guide rib 119 may guide air, which is introduced into the camera receiving space 124, to the lower side of the camera 80. That is, the air introduced into the camera receiving space 124 may be guided to the lateral side or the lower side of the camera 80 by the guide rib 119, and thus the camera 80 may be uniformly cooled as a whole. Alternatively, the camera 80 may be cooled sequentially from the bottom to the top, that is, in the direction from the lens 85 to the camera substrate 82.

As described above, the lower portion of the camera 80, which is close to the cooking chamber 40 and thus receives the most heat, may be cooled first, and thus it is possible to increase a cooling efficiency of the camera 80.

The lower housing 121 may include a lower opening 126 formed in a lower portion of the camera receiving space 124. The lower opening 126 may be formed in a lower portion of the camera receiving member 123. The camera 80 received in the camera receiving space 124 may image the inside of the cooking chamber 40 through the lower opening 126.

The lower opening 126 may be open to allow air to flow. That is, a blocking member such as glass may not be provided in the lower opening 126. Because the blocking member such as glass is not provided in the lower opening 126, the camera 80 may be installed closer to the cooking chamber 40. According to this embodiment, the lens 85 of the camera 80 may be disposed at a height corresponding to the lower opening 126. According to embodiments, the lens 85 of the camera 80 may be disposed lower than the lower opening 126. Further, according to embodiments, a blocking member (not shown) may be provided in the lower opening 126 to block the lower opening 126. The blocking member may be formed of a transparent material.

A lower cooling flow path 129 may be formed between the lower opening 126 and the transparent member 17 provided on the upper wall 12 of the inner case 11.

Air sucked from the outside of the main body 10 by the camera cooling fan 90 may be supplied to the upper surface of the transparent member 17 through the lower cooling flow path 129 and thus the transparent member 17 may be cooled. Accordingly, it is possible to obtain an effect of blocking heat, which is to be transmitted to the camera 80, from the transparent member 17. In addition, the lens 85 at the bottom of the camera 80 may be cooled more efficiently by the air flow that descends to the transparent member 17 and then rises again.

In addition, foreign substances attached to the surface of the lens 85 may be effectively cleaned from the lens 85 by U-shaped airflow that descends and ascends around the lens 85.

The transparent member 17 may include at least one glass 18 mounted in an opening of the upper wall 12. At least one glass may be formed of heat-resistant tempered glass or borosilicate glass. An air insulation layer may be formed between at least one glass. However, the transparent member 17 may be formed of a material other than glass that is transparent and resistant to heat.

The cooking apparatus 1 may include a sealing member 150 provided to seal the lower cooling flow path 129 to prevent air in the lower cooling flow path 129 from leaking into the electronic compartment 50. When the air of the camera cooling duct 100 leaks into the exhaust space 52 of the electronic compartment 50 through the lower cooling flow path 129, a pressure loss in the camera cooling duct 100 may occur and the air may interrupt a flow of air discharged to the outside of the main body 10 through the exhaust space 52. That is, when the airflow through the camera cooling fan 90 and the camera cooling duct 100 is not separated from the airflow through the electronic compartment cooling fan 60 and the electronic compartment duct 70, each cooling efficiency may be reduced.

The sealing member 150 may seal the lower cooling flow path 129 to prevent air in the lower cooling flow path 129 from leaking into the electronic compartment 50. The sealing member 150 may be formed of an elastic material such as rubber, and may adhere between the lower surface of the housing 110 and the upper surface of the upper wall 12. Particularly, an upper surface of the sealing member 150 may be in close contact with the lower surface of the camera receiving member 123 of the housing 110, and a lower surface of the sealing member 150 may be in close contact with an upper surface of the glass 18 forming the upper wall 12 or the transparent member 17.

The sealing member 150 may have a ring shape including a hollow 151, and the camera 80 may image the inside of the cooking chamber 40 through the hollow 151. The sealing member 150 may be mounted in the opening 31 of the base plate 30.

The suction duct 130 may be coupled to the housing 110 to suck air from the outside of the main body 10 and guide the air to the housing 110. The suction duct 130 may suck air from the outside of the main body 10 at a relatively lower temperature than that of the electronic compartment 50.

Therefore, the camera 80 may be cooled more effectively than other electronic components. The suction duct 130 may suck outside air from the rear of the main body 10. For this, the suction duct 130 may be coupled to the rear plate 25 forming the rear surface of the main body 10. An outside air inlet 25a (refer to FIG. 16) may be formed in the rear plate 25 to allow air outside the main body 10 to be sucked. The outside air inlet 25a may be formed to be more recessed than a periphery of the outside air inlet 25a to allow outside air to be efficiently sucked. The outside air inlet 25a may be formed to be recessed by 3 mm or more than the periphery of the outside air inlet 25a.

As mentioned above, because the suction duct 130 sucks air from the rear of the main body 10, foreign substances such as water or oil may be prevented from entering the camera 80 or the camera cooling fan 90.

The discharge duct 140 may be coupled to the housing 110 to discharge air, which cools the camera 80, from the housing 110. The discharge duct 140 may discharge air into the electronic component space 51 of the electronic compartment 50. As the discharge duct 140 discharges air into the electronic component space 51, the air discharged from the discharge duct 140 may not collide with or merge with air that is discharged to the front side along the exhaust space 52 of the electronic compartment duct 70 by the blowing force of the electronic compartment cooling fan 60. Therefore, it is possible to prevent a reduction in cooling efficiency of the electronic compartment performed by the electronic compartment cooling fan 60 and the electronic compartment duct 70.

Particularly, the discharge duct 140 may discharge air toward the circuit board 3 disposed in the electronic component space 51. The circuit board 3 is an electronic component that is relatively vulnerable to heat. As described above, because air flowing by the camera cooling fan 90 is directly sucked from the outside of the main body 10, the air may have a relatively lower temperature than air flowing by the electronic compartment cooling fan 60. Because the low-temperature air, which is moved by the camera cooling fan 90, is supplied toward the circuit board 3, the circuit board 3, which is vulnerable to heat, may be efficiently cooled.

However, the discharge duct 140 may be omitted from the camera cooling duct 100 according to embodiments. When the discharge duct 140 is omitted, air may be discharged into the electronic component space 51 through the outlet 116 of the housing 110.

Figure 14:
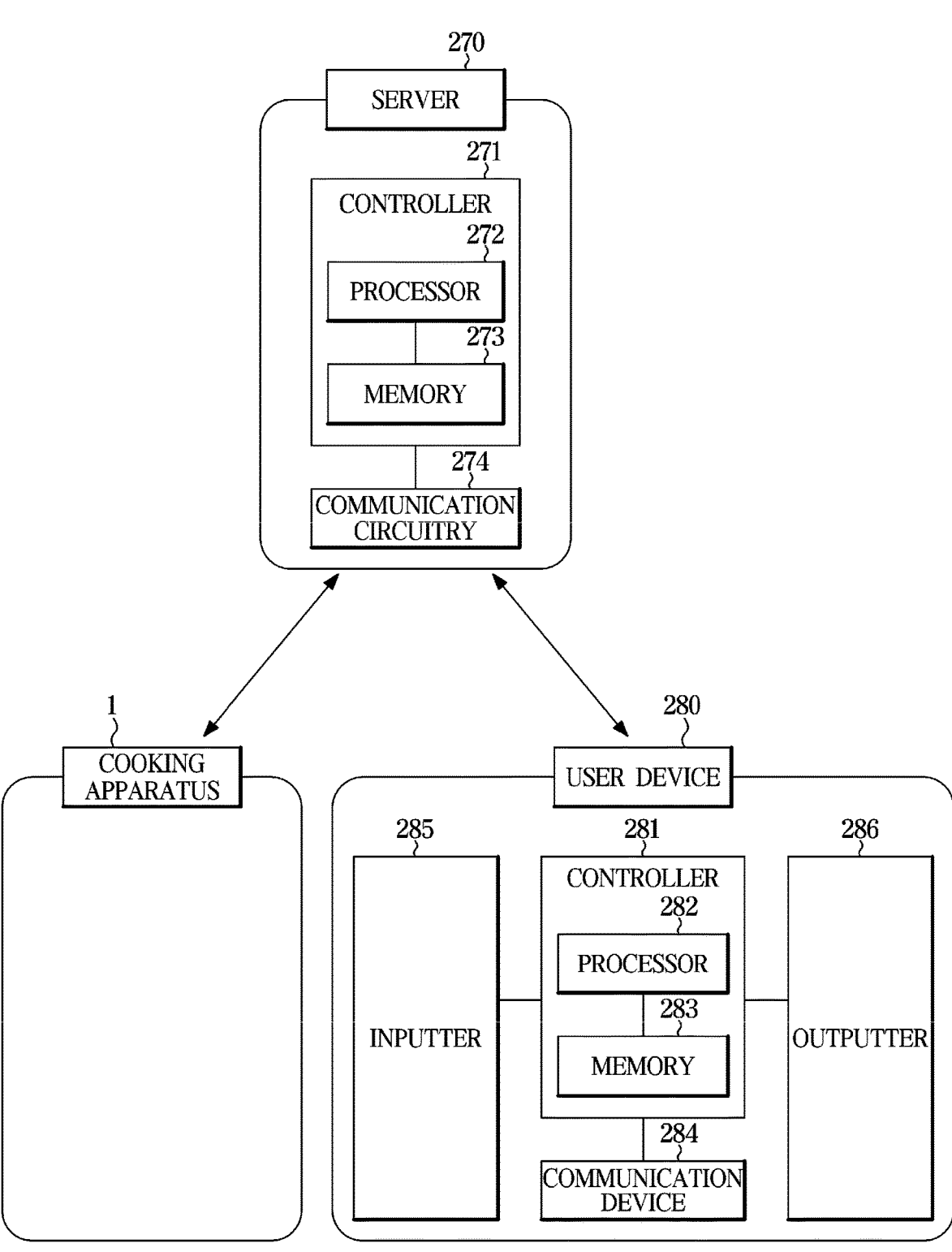
FIG. 14 is a control block diagram of the cooking apparatus, a server, and a user device according to an embodiment of the disclosure.

FIG. 14 is a control block diagram of the cooking apparatus, a server, and a user device according to an embodiment of the disclosure.

As illustrated in FIG. 14, a communication system according to an embodiment may include the cooking apparatus 1 and a server 270. The communication system according to an embodiment may further include a user device 280.

The server 270 may include a communication circuitry 274 configured to communicate with other server, the cooking apparatus 1 or the user device 280. The server 270 may include a controller 271. The controller 271 may include at least one processor 272 configured to process data received from other server, the cooking apparatus 1, or the user device 280, and at least one memory 273 configured to store a program for processing the data, or processed data.

The server 270 may be implemented with various computing devices such as a workstation, a cloud, a data drive, and a data station. The server 270 may be implemented as one or more servers that are physically or logically divided based on functions, detailed configurations of functions, or data. The server 270 may transmit and receive data through communication between each server, and may process the transmitted and received data.

The server 270 may perform functions such as managing a user account, registering the cooking apparatus 1 by linking the cooking apparatus 1 to the user account, and managing or controlling the registered cooking apparatus 1. For example, a user can access the server 270 through the user device 280 and create a user account. The user account may be identified by an identification (ID) and a password set by the user. The server 270 may register the cooking apparatus 1 in a user account according to a predetermined procedure. For example, the server 270 may register, manage, and control the cooking apparatus 1 by connecting identification information (e.g., serial number or MAC address) of the cooking apparatus 1 to a user account.

The user device 280 may include a communication device 284 configured to communicate with the cooking apparatus 1 or the server 270, and a user interface configured to receive a user input or configured to output information to a user. The user interface may include an inputter 285 and an outputter 286. The user device 280 may include a controller 281. The controller 281 may include at least one processor 282 configured to control the operation of the user device 280 and at least one memory 283 configured to store a program for controlling the operation of the user device 280.

The user device 280 may be carried by a user or placed in the user's home or office. The user device 280 may include a personal computer, a terminal, a portable telephone, a smart phone, a handheld device, a wearable device, and the like, but is not limited thereto.

A program, that is an application, for controlling the cooking apparatus 1 may be stored in the memory 283 of the user device 280. The application may be sold in a state of being installed on the user device 280 or may be downloaded and installed from an external server.

A user can access the server 270 and create a user account by executing an application installed on the user device 280, and the user can register the cooking apparatus 1 by communicating with the server 270 based on the logged-in user account.

For example, when a user manipulates the cooking apparatus 1 to allow the cooking apparatus 1 to access the server 270 according to a procedure guided by an application installed on the user device 280, it is possible to register the cooking apparatus 1 to the user account by registering identification information (e.g., a serial number or a MAC address) of the cooking apparatus 1 to the corresponding user account in the server 270.

A user can control the cooking apparatus 1 using an application installed on the user device 280. For example, when a user logs in to the user account with the application installed on the user device 280, the cooking apparatus 1 registered in the user account may appear, and when a control command for the cooking apparatus 1 is input, the control command may be transmitted to the cooking apparatus 1 through the server 270.

A network may include both a wired network and a wireless network. The wired network may include a cable network or a telephone network, and the wireless network may include any network that transmits and receives signals through radio waves. The wired network and the wireless network may be connected to each other.

The network may include a wide area network (WAN) such as the Internet, a local area network (LAN) formed around an access point (AP), and/or a short-range wireless network that does not pass through an access point (AP). The short-range wireless network may include Bluetooth™ (IEEE 802.15.1), Zigbee (IEEE 802.15.4), Wi-Fi Direct, Near Field Communication (NFC), Z-Wave and the like, but is not limited to thereto.

The access point (AP) may connect the cooking apparatus 1 or the user device 280 to the wide area network (WAN) to which the server 270 is connected. The cooking apparatus 1 or the user device 280 may be connected to the server 270 through the wide area network (WAN).

The access point (AP) may communicate with the cooking apparatus 1 or the user device 280 through the wireless communication such as Wi-Fi™ (IEEE 802.11), Bluetooth™ (IEEE 802.15.1), and Zigbee (IEEE 802.15.4), and may access the wide area network (WAN) through the wired communication, but is not limited thereto.

According to various embodiments, the cooking apparatus 1 may be directly connected to the user device 280 or the server 270 without passing through the access point (AP).

The cooking apparatus 1 may be connected to the user device 280 or the server 270 through a long-range wireless network or a short-range wireless network.

For example, the cooking apparatus 1 may be connected to the user device 280 through a short-range wireless network (e.g., Wi-Fi Direct).

As another example, the cooking apparatus 1 may be connected to the user device 280 or the server 270 through the wide area network (WAN) using a long-distance wireless network (e.g., a cellular communication module).

As another example, the cooking apparatus 1 may access the wide area network (WAN) using wired communication and be connected to the user device 280 or the server 270 through the wide area network (WAN).

When the cooking apparatus 1 is allowed to access the wide area network (WAN) using the wired communication, the cooking apparatus 1 may also operate as the access point. Accordingly, the cooking apparatus 1 may connect other home appliance to the wide area network (WAN) to which the server 270 is connected. Further, other home appliance may connect the cooking apparatus 1 to the wide area network (WAN) to which the server 270 is connected.

The cooking apparatus 1 may transmit information related to the operation or state to other home appliance, the user devices 280, or the server 270 through a network. For example, when a request is received from the server 270, or when a specific event occurs in the cooking apparatus 1, the cooking apparatus 1 may transmit information related to the operation or state to other home appliance, the user devices 280 or the server 270. Further, the cooking apparatus 1 may transmit information related to the operation or state to other home appliance, the user devices 280 or the server 270, periodically or in real time. When the server 270 receives information related to the operation or state of the cooking apparatus 1, the server 270 may update stored information related to the operation or state of the cooking apparatus 1, and transmit the updated information related to the operation or state of the cooking apparatus 1 to the user device 280 through the network. Updating information may include various operations for changing existing information, such as adding new information to existing information and replacing existing information with new information.

The cooking apparatus 1 may obtain various information from other home appliance, the user device 280 or the server 270 and provide the obtained information to a user. For example, the cooking apparatus 1 may obtain information related to functions of the cooking apparatus 1 (e.g., recipe) and various environmental information (e.g., weather, temperature, humidity, etc.) from the server 270, and output the obtained information through the user interface.

The cooking apparatus 1 may operate according to a control command received from other home appliance, the user device 280 or the server 270. For example, when the cooking apparatus 1 obtains prior approval from a user to operate according to the control command of the server 270 even without a user input, the cooking apparatus 1 may operate according to a control command received from the server 270. The control command received from the server 270 may include a control command that is input by a user through the user device 280 or a control command based on preset conditions, but is not limited thereto.

The user device 280 may transmit information about the user to the cooking apparatus 1 or the server 270 through the communication module. For example, the user device 280 may transmit information about a user's location, a user's health condition, a user's taste, and a user's schedule to the server 270. The user device 280 may transmit information on the user to the server 270 according to the user's prior approval.

The cooking apparatus 1, the user device 280, or the server 270 may determine a control command using technology such as artificial intelligence. For example, the server 270 may receive information related to the operation or state of the cooking apparatus 1 or information related to the user of the user device 280, process the received information using technology such as artificial intelligence, and transmit a processing result or a control command to the cooking apparatus 1 or the user device 280 based on the processing result.

Figure 15:
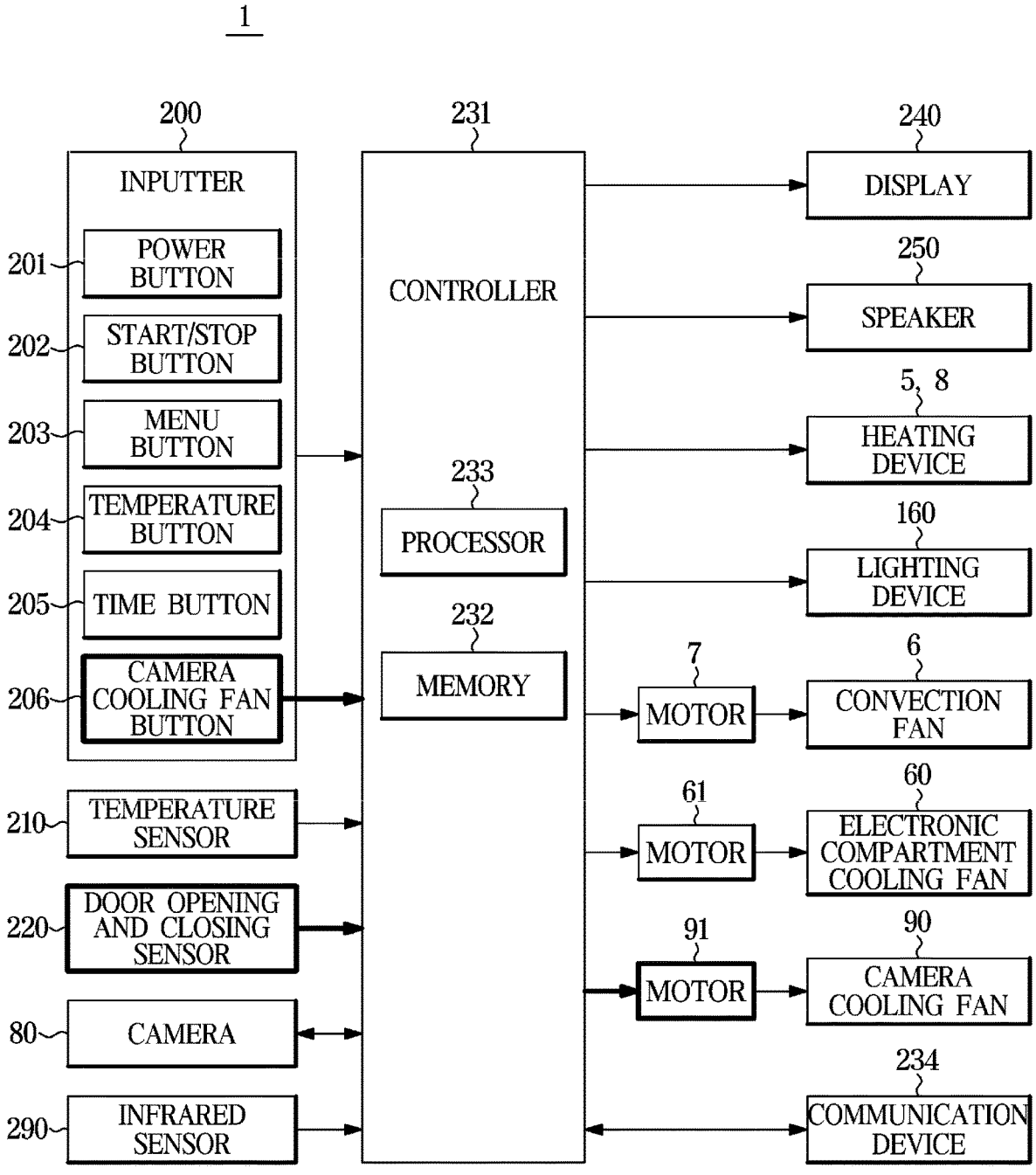
FIG. 15 is a control block diagram of the cooking apparatus according to an embodiment of the disclosure.

FIG. 15 is a control block diagram of the cooking apparatus according to an embodiment of the disclosure.

As illustrated in FIG. 15, the cooking apparatus 1 may include user interfaces 200, 240, and 250, a temperature sensor 210, a door opening and closing sensor 220, the camera 80, and heating devices 5 and 8, the lighting device 160, the convection fan 6, the convection fan motor 7, the electronic compartment cooling fan 60, the electronic compartment cooling fan motor 61, the camera cooling fan 90, the camera cooling fan motor 91, a communication device 234 and a controller 231.

The user interface may include an inputter 200 configured to obtain a user input and a display 240 configured to display various types of information related to the operation and state of the cooking apparatus 1. The user interface may further include a speaker 250.

The inputter 200 and the display 240 may be provided in various positions of the main body 10. For example, the inputter 200 and the display 240 may be located on the upper front surface of the main body 10. The inputter 200 and the display 240 may be provided on the control panel 27 located on the upper front surface of the main body 10.

The inputter 200 may obtain a user input. The user input may include various commands. The inputter 200 may transmit an electronic signal (voltage or current) corresponding to a user input to the controller 231.

The inputter 200 may include various buttons and/or dials. For example, the inputter 200 may include a power button 201 configured to receive a command to turn on or off the power, a start/stop button 202 configured to receive a command to start or stop cooking, a menu button 203 configured to receive a command to select a cooking course, a temperature button 204 configured to receive a command to adjust a heating level of a heater, a time button 205 configured to receive a command to adjust a cooking time, and a camera cooling fan button 206 configured to receive a command to operate the camera cooling fan 90. Various buttons may be provided as physical buttons or touch buttons.

The display 240 may display information related to the state and operation of the cooking apparatus 1. The display 240 may display information input by the user or information provided to the user on various screens. The display 240 may display information related to the operation of the cooking apparatus 1 as at least one of images and text. Further, the display 240 may display a graphic user interface (GUI) for the control of the cooking apparatus 1. That is, the display 240 may display a user interface element (UI) such as an icon.

The display 240 may be provided with various types of display panels. For example, the display 240 may include a Liquid Crystal Display Panel (LCD Panel), a Light Emitting Diode Panel (LED Panel), an Organic Light Emitting Diode Panel (OLED Panel), or a micro-LED panel. The display 240 may also be used as an input device by including a touch screen.

The temperature sensor 210 may detect a temperature inside the cooking chamber 40. The temperature sensor 210 may be installed in various positions inside the cooking chamber 40. The temperature sensor 210 may transmit an electronic signal corresponding to the detected temperature to the controller 231. The controller 231 may control at least one of the heating devices 5 and 8 and the convection fan 6 to allow the temperature inside the cooking chamber 40 to be maintained at a cooking temperature determined according to the type, number, size, and/or cooking course of food.

The door opening and closing sensor 220 may detect whether the door 2 is in an open state or a closed state. The door opening and closing sensor 220 may transmit an electronic signal according to the state of the door 2 to the controller 231.

The heating devices 5 and 8 may supply heat to the inside of the cooking chamber 40. Food may be cooked by heat generated by the heating devices 5 and 8. The heating level and heating time of the heating devices 5 and 8 may be adjusted by the controller 231. The output and heating time of the heating devices 5 and 8 may be differently adjusted according to the type, number and/or size of food. That is, the operation of the heating devices 5 and 8 may be differently controlled according to the cooking course.

The lighting device 160 may emit light into the cooking chamber 40. The inside of the cooking chamber 40 may be brightened by light emitted from the lighting device 160.

The controller 231 may control the lighting device 160 to emit light when the cooking apparatus 1 is turned on. The controller 231 may control the lighting device 160 to emit light until the cooking is completed or until the power of the cooking apparatus 1 is turned off.

The convection fan 6 may circulate air inside the cooking chamber 40. The convection fan 6 may be driven by the convection fan motor 7. The convection fan motor 7 may be electrically connected to the controller 231.

The electronic compartment cooling fan 60 may circulate air inside the electronic compartment 50. The electronic compartment fan 60 may be driven by the electronic compartment fan motor 61. The electronic compartment fan motor 61 may be electrically connected to the controller 231.

The camera 80 may obtain an image of the inside of the cooking chamber 40. Food-related information such as the type, number, size, and cooking state of food disposed inside the cooking chamber 40 may be identified based on the image obtained by the camera 80. The controller 231 may perform cooking based on the food-related information. In addition, the image obtained by the camera 80 may be displayed on the display 240 or transmitted to the user device 280 to allow a user to check the state inside the cooking chamber 40 without opening the door 2.

The camera cooling fan 90 may blow air toward the camera 80 to cool the camera 80. Meanwhile, when the camera cooling fan 90 rotates and air flows around the camera 80, foreign substances such as dust attached to the lens 85 of the camera 80 and the transparent member 17 may be removed. That is, when the camera cooling fan 90 operates, the camera 80 may be cooled, and at the same time, foreign substances attached to the lens 85 of the camera 80 or the transparent member 17 may be removed.

The camera cooling fan 90 may operate mainly for cooling the camera 80, or mainly for removing foreign substances attached to the lens 85 of the camera 80 or the transparent member 17.

That the camera cooling fan 90 mainly operates to cool the camera 80 may be referred to that the camera cooling fan 90 performs a cooling mode, and that the camera cooling fan 90 mainly operates to remove foreign substances attached to the lens 85 of the camera 80 or the transparent member 17 may be referred to that the camera cooling fan 90 performs a cleaning mode.

The cooling mode may be performed during cooking in which the internal temperature of the cooking chamber 40 is high. Conversely, the cleaning mode may be performed when not cooking. For example, the cleaning mode may be performed before identifying food using the camera 80 to select a cooking course. This is because it is appropriate to remove foreign substances attached to the lens 85 of the camera 80 or the transparent member 17 in order to accurately identify food with the camera 80. The cleaning mode may be performed based on determining that a foreign substance is present in the lens 85 of the camera 80 or the transparent member 17.

Alternatively, the cleaning mode may be periodically performed regardless of whether a foreign substance is present in the lens 85 of the camera 80 or the transparent member 17.

The controller 231 may be electrically connected to the components of the cooking apparatus 1 and control the components of the cooking apparatus 1. The controller 231 may control the operation of the cooking apparatus 1 by processing a command received through at least one of the inputter 200 and the user device 280.

The controller 231 may include a processor 232 and a memory 233. The processor 232 is hardware and may include a logic circuit and an arithmetic circuit. The processor 232 may control components, which are electrically connected, of the cooking apparatus 1 by using programs, instructions, and/or data stored in the memory 233 for the operation of the cooking apparatus 1. The controller 231 may be implemented as a control circuit including circuit elements such as a capacitor, an inductor, and a resistance element. The processor 232 and the memory 233 may be implemented as separate chips or as a single chip. Further, the controller 231 may include a plurality of processors and a plurality of memories.

The memory 233 may store programs, applications, and/or data for the operation of the cooking apparatus 1 and may store data generated by the processor 232. The memory 233 may include non-volatile memory such as read only memory (ROM) and flash memory for long-term storage of data. The memory 233 may include volatile memory such as static random access memory (S-RAM) and dynamic random access memory (D-RAM) for temporarily storing data.

The controller 231 may identify food included in an image obtained by the camera 80. The controller 231 may identify food from the image by using a learning model obtained from the memory 233 or the server 270.

The controller 231 may identify a foreign substance other than food from the image obtained by the camera 80. Based on the image obtained by the camera 80, the controller 231 may identify a foreign substance attached to the lens 85 of the camera 80 or attached to the transparent member 17 located under the lens 85.

When a foreign substance such as dust is attached to the lens 85 of the camera 80 or the transparent member 17, the camera 80 may not obtain a normal image of the inside of the cooking chamber 40. Therefore, when the foreign substance is present, it is required to remove the foreign substance so as to allow the camera 80 to perform a normal function.

The controller 231 may operate the camera 80 to obtain an image of the inside of the cooking chamber 40. Based on the image obtained by the camera 80, the controller 231 may identify information related to a foreign substance present in the lens 85 of the camera 80 or the transparent member 17. The controller 231 may control the camera cooling fan motor 91 to perform the cleaning mode, in which the camera cooling fan 90 is rotated, based on the foreign substance-related information.

The foreign substance-related information may include at least one of presence or absence of foreign substance, the number of foreign substances, or a ratio of an area occupied by the foreign substance to an entire area of the image obtained by the camera 80.

The controller 231 may identify foreign substance-related information from an image using a learning model obtained from the memory 233 or the server 270. When the image obtained by the camera 80 is input to the learning model, the learning model may output whether a foreign substance is present or not, the number of foreign substances, and a ratio of an area occupied by the foreign substance.

The learning model may mean an artificial intelligence model. The learning model may be created through machine learning and/or deep learning. The learning model may be generated by the server 270 and may be stored in the memory 220 of the cooking apparatus 1. The learning algorithm may include supervised learning, unsupervised learning, semi-supervised learning, or reinforcement learning, and is limited thereto.

The learning model may include a plurality of artificial neural network layers. Artificial neural networks may include deep neural networks (DNNs), convolutional neural networks (CNNs), recurrent neural networks (RNNs), restricted boltzmann machines (RBMs), deep belief networks (DBNs), bidirectional recurrent deep neural networks (BRDNNs), and/or deep Q-networks, but is not limited thereto. In addition to hardware structures, the artificial intelligence model may additionally or alternatively include software structures.

The learning model may identify foreign substance-related information based on focus information of the image. The foreign substance attached to the lens 85 of the camera 80 or the transparent member 17 may be out of focus in comparison with the food, and thus the learning model may identify foreign substance-related information based on the focus information of the image obtained by the camera 80. The focus information of the image may include information such as a distance between an object and the lens 85, depth, and pixel dispersion.

Further, the learning model 231 may identify foreign substance-related information included in a target image based on a result of comparing a clean cooking chamber image with the target image. The clean cooking chamber image may be an image of the cooking chamber 40 that is imaged in a clean state in which food is not disposed inside the cooking chamber 40 and a foreign substance is not present inside the cooking chamber 40.

The clean cooking chamber image may be stored in the server 270. The controller 231 may transmit an image of the inside of the cooking chamber 40, which is obtained by the camera 80 when the cooking apparatus 1 is first started to be used, to the server 270 through the communication device 234. The server 270 may compare the transmitted image with the clean cooking chamber image stored in the server 270, thereby updating the clean cooking chamber image.

The communication device 234 may perform a connection with at least one of the user device 280 or the server 270 through a network. For example, the communication device 234 may receive a remote-control signal from the user device 280. The controller 231 may obtain various information and/or data from the server 270 through the communication device 234. The controller 231 may obtain a learning model from the server 270 through the communication device 234.

The communication device 234 may include various communication modules. The communication device 234 may include a wireless communication module and/or a wired communication module. Wireless local area network (LAN), home radio frequency (RF), infrared communication, ultra-wide band (UWB) communication, Wi-Fi, Bluetooth, Zigbee, and the like may be applied as a wireless communication technology.

The cooking apparatus 1 may further include an infrared sensor 290 configured to detect whether a foreign substance is attached to the camera 80. The infrared sensor 290 may detect a physical quantity or a chemical quantity such as temperature, pressure, or radiation intensity using infrared rays, and convert the detected physical quantity or chemical quantity into an electronic signal. The infrared sensor 290 may be provided adjacent to the camera 80 and emit infrared rays toward the camera 80. The infrared sensor 290 may include a light emitter configured to generate infrared rays and a light receiver configured to detect infrared rays. The infrared sensor 290 may transmit an electronic signal corresponding to the detected information to the controller 231. The controller 231 may control the camera cooling fan motor 91 to allow the camera cooling fan 90 to perform the cleaning mode based on information detected by the infrared sensor 290.

The components of the cooking apparatus 1 are not limited to those described above. The cooking apparatus 1 may further include various components in addition to the above components, and some of the above components may be omitted.

Figure 16:
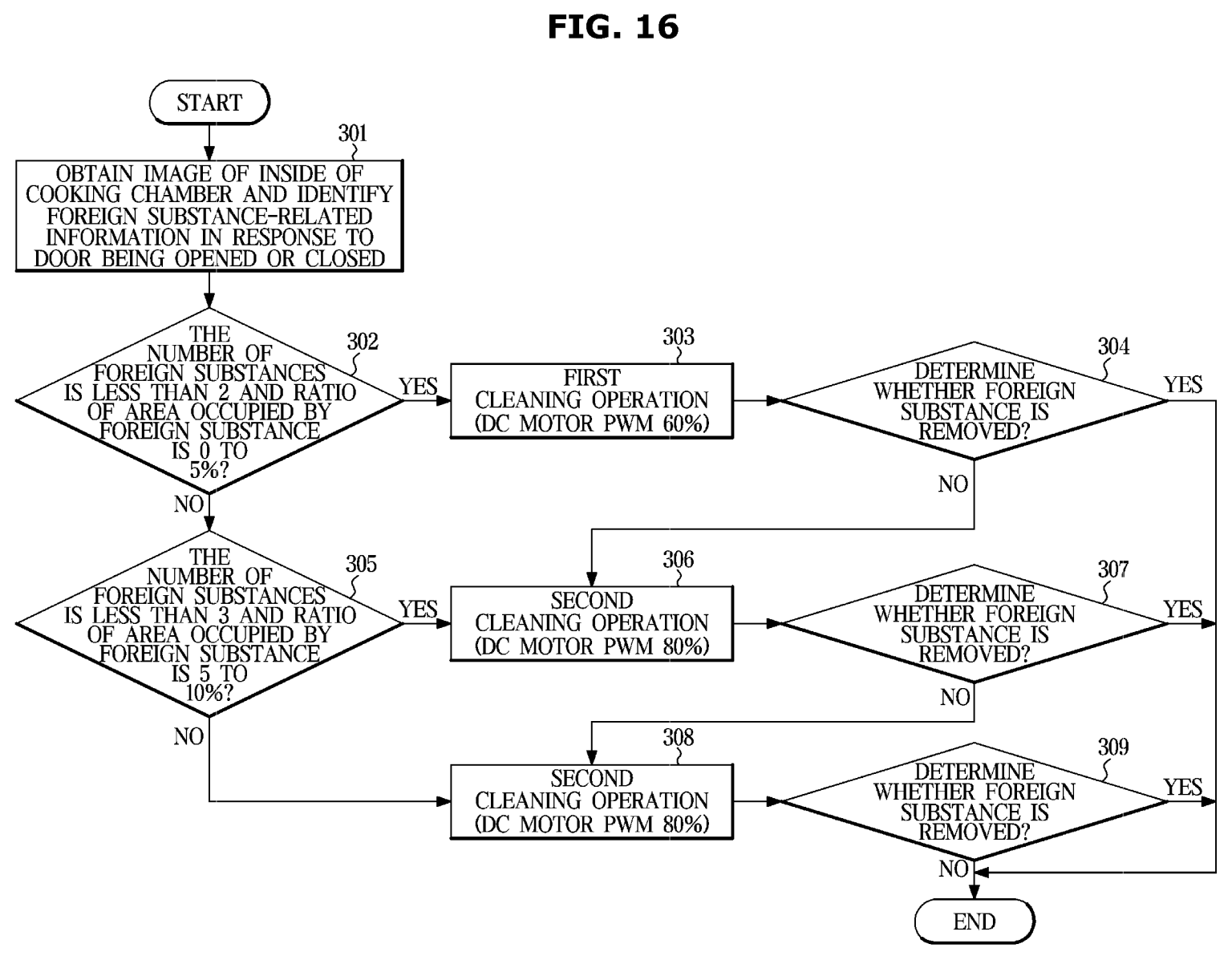
Figure 17:
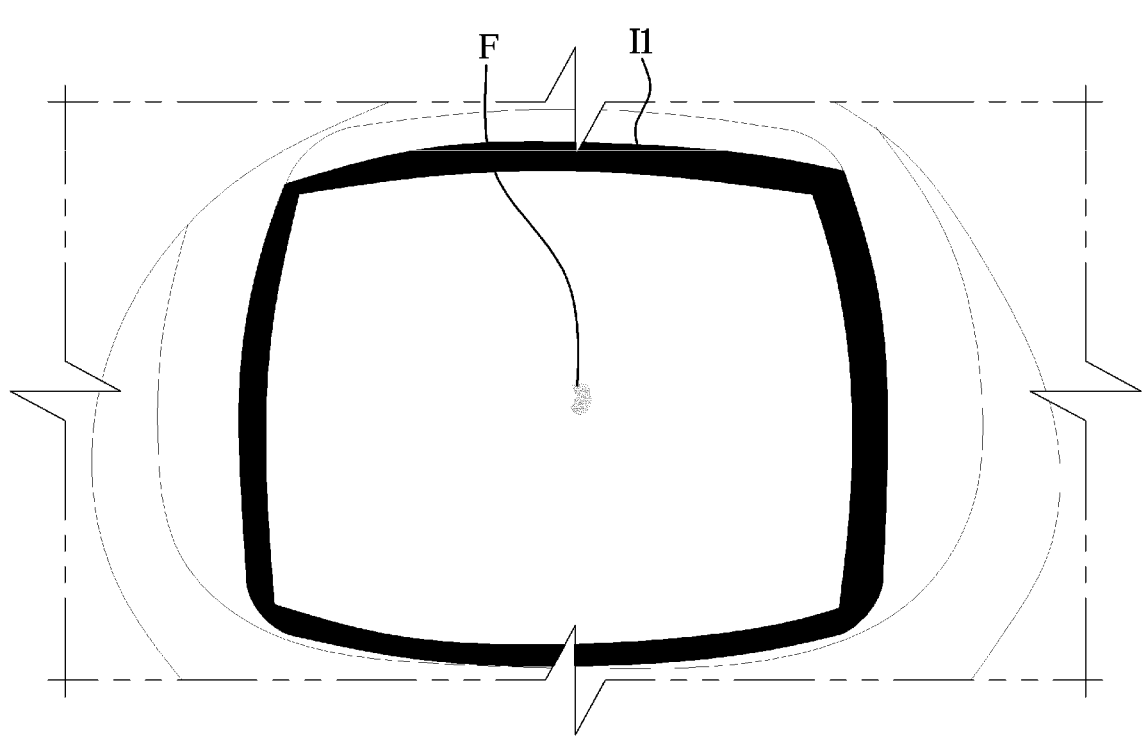
FIG. 17 is an example of a first image obtained by the camera according to an embodiment of the disclosure.
Figure 18:
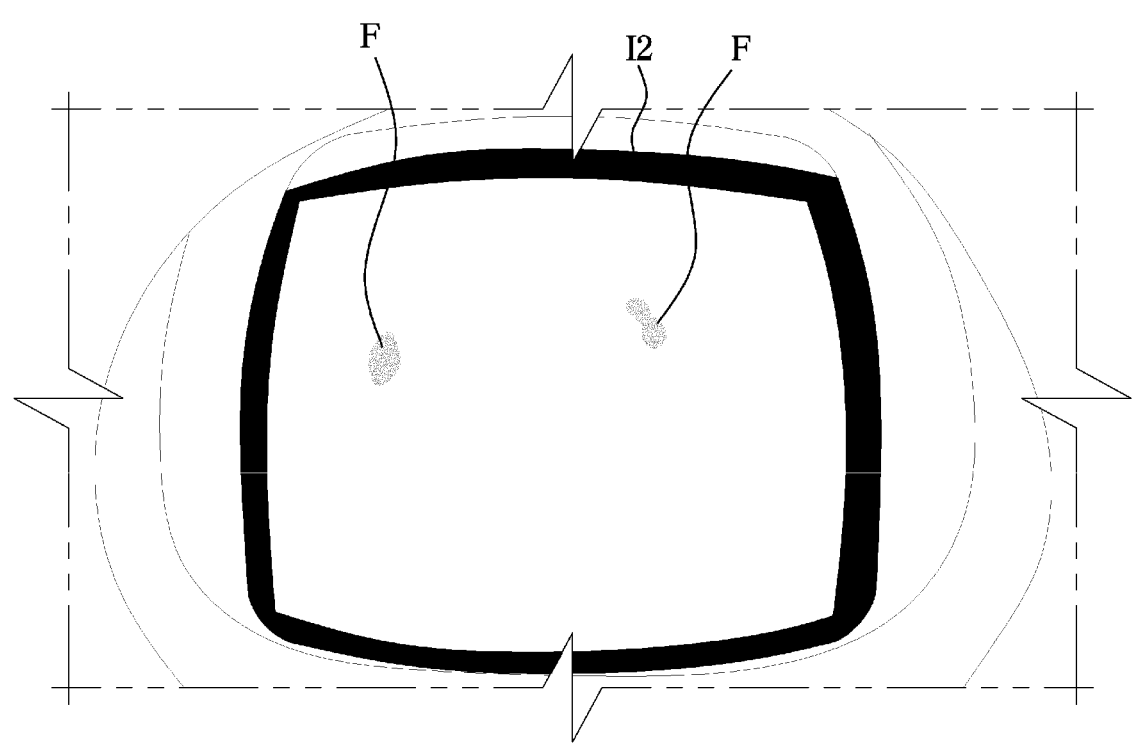
FIG. 18 is an example of the first image obtained by the camera according to an embodiment of the disclosure.
Figure 19:
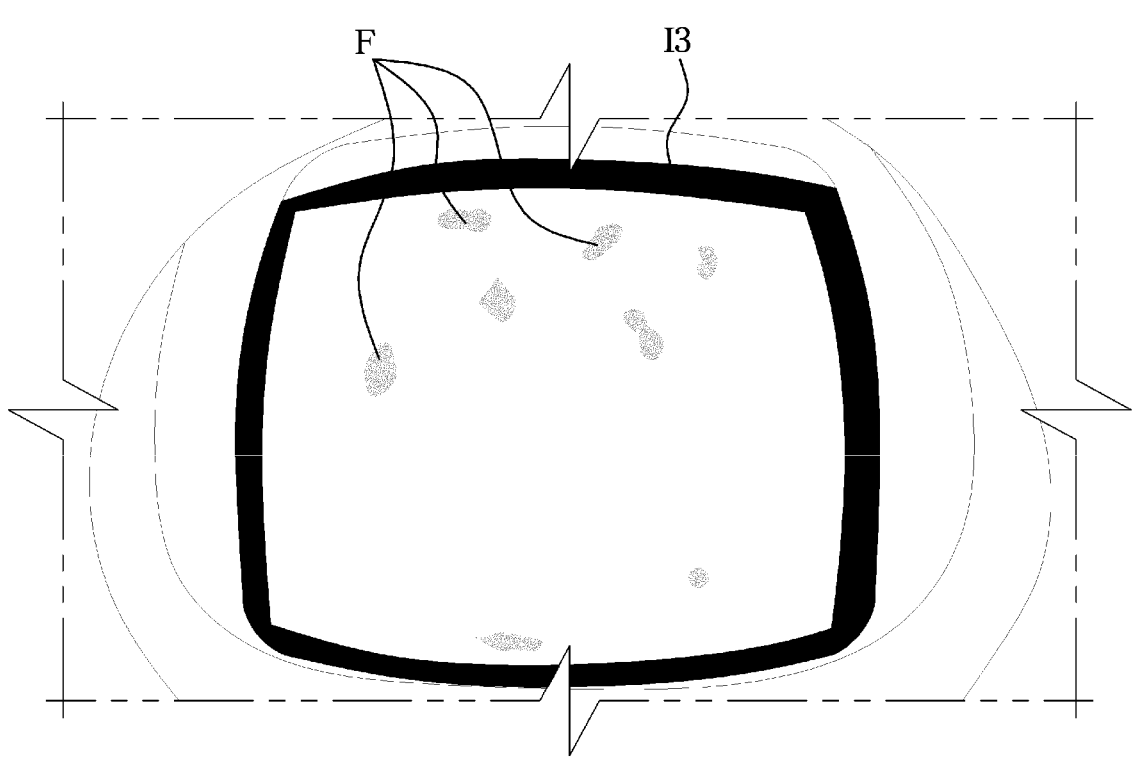
FIG. 19 is an example of the first image obtained by the camera according to an embodiment of the disclosure.

FIG. 16 is a flowchart illustrating a control method of the cooking apparatus according to an embodiment of the disclosure. FIG. 17 is an example of a first image obtained by the camera according to an embodiment of the disclosure. FIG. 18 is an example of the first image obtained by the camera according to an embodiment of the disclosure. FIG. 19 is an example of the first image obtained by the camera according to an embodiment of the disclosure.

As illustrated in FIGS. 16 to 19, the controller 231 may operate the camera 80 to obtain a first image of the inside of the cooking chamber 40 (301). The controller 231 may obtain the first image by periodically operating the camera 80. For example, the controller 231 may operate the camera 80 based on the door 2 being opened or being closed.

The controller 231 may identify foreign substance-related information of the lens 85 of the camera 80 or the transparent member 17 from the first image (301, 302, and 305). The controller 231 may identify the foreign substance-related information from the first image by using the learning model.

The foreign substance-related information may include at least one of presence or absence of foreign substance, the number of foreign substances, or a ratio of an area occupied by the foreign substance to an entire area of the first image. Identifying the foreign substance-related information may include determining whether the foreign substance is present or not.

Based on the foreign substance-related information, the controller 231 may control the operation of the camera cooling fan motor 91 to allow the camera cooling fan 90 to perform the cleaning mode.

Based on the foreign substance-related information, the controller 231 may control the operation of the camera cooling fan motor 91 to perform the cleaning mode in which the camera cooling fan 90 is rotated at a first rotation speed for a first rotation time.

The controller 231 may determine the first rotation speed and the first rotation time based on the foreign substance-related information (303, 306, and 308).

For example, the controller 231 may determine the first rotation speed as a rotation speed corresponding to Pulse Width Modulation (PWM) 60% in response to the number of foreign substances F included in the first image I1 being less than 2 and in response to the ratio of the area occupied by the foreign substance to the entire area of the first image being 0 to 5% (302 and 303).

The controller 231 may determine the first rotation speed as a rotation speed corresponding to PWM 80% in response to the number of foreign substances F included in the first image I2 being less than 3 and in response to the ratio of the area occupied by the foreign substance to the entire area of the first image being 5 to 10% (305 and 306).

The controller 231 may determine the first rotation speed as a rotation speed corresponding to PWM 100% in response to the number of foreign substances F included in the first image I3 not satisfying the conditions of the above operations 302 and 305, and in response to the ratio of the area occupied by the foreign substance to the entire area of the first image not satisfying the conditions of the above operations 302 and 305 (308).

By controlling the speed of the camera cooling fan 90 differently according to the foreign substance-related information, unnecessary energy consumption and noise generation may be reduced, and the foreign substance may be removed more efficiently.

After performing the cleaning mode, the controller 231 may determine whether the foreign substance attached to the lens 85 of the camera 80 or the transparent member 17 is removed (304, 307, and 309).

The controller 231 may operate the camera 80 to obtain a second image of the inside of the cooking chamber 40 to determine whether the foreign substance is removed.

The controller 231 may identify foreign substance-related information of the lens 85 of the camera 80 or the transparent member 17 from the second image obtained by the camera 80. The controller 231 may identify the foreign substance-related information by using the learning model.

Based on the foreign substance-related information identified from the second image, the controller 231 may determine whether the foreign substance is removed by performing the cleaning mode (304, 307, and 309).

The controller 231 may control the operation of the motor 91 to additionally perform the cleaning mode based on determining that foreign substance is not removed by the cleaning mode.

The controller 231 may determine a second rotation speed and a second rotation time of the camera cooling fan 90 in the additional cleaning mode. The controller 231 may determine the second rotation speed to be faster than the first rotation speed. The controller 231 may determine the second rotation time to be the same as or different from the first rotation time.

As mentioned above, the controller 231 may determine whether the foreign substance is removed after performing the cleaning mode, and when the foreign substance is not removed, the controller 231 may increase the rotation speed of the camera cooling fan 90 to repeatedly perform the cleaning mode several times. After the last cleaning mode, in which the rotation speed of the camera cooling fan 90 is maximized, is performed, the cleaning mode may not be performed any more.

Figure 20:
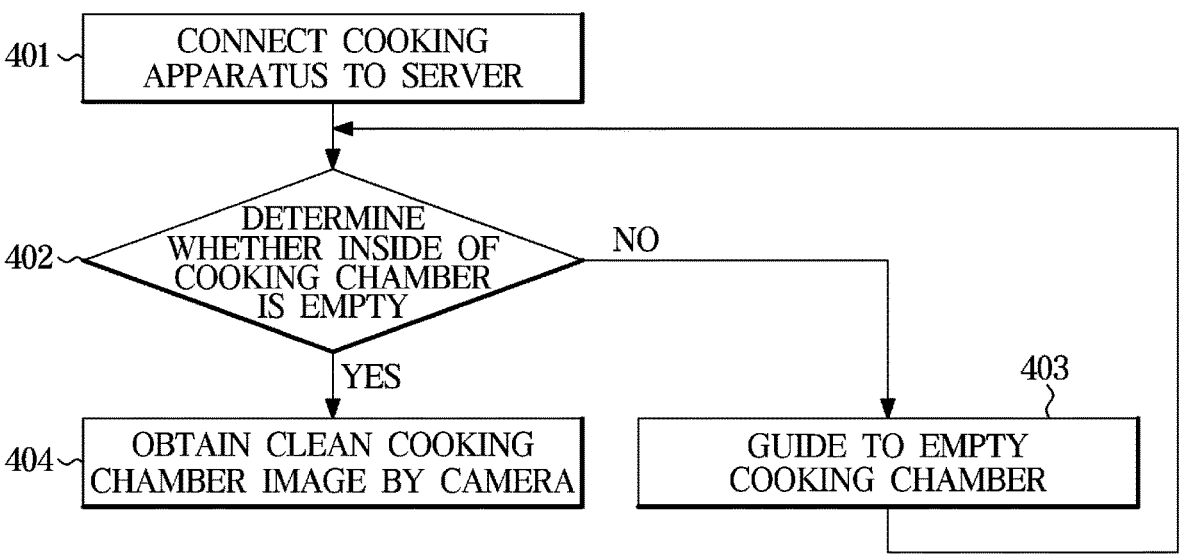
FIG. 20 is a flowchart illustrating a procedure for obtaining a clean cooking chamber image according to an embodiment of the disclosure.

FIG. 20 is a flowchart illustrating a procedure for obtaining a clean cooking chamber image according to an embodiment of the disclosure.

As described above, the clean cooking chamber image may be an image of the cooking chamber 40 obtained in the clean state in which food is not disposed inside the cooking chamber 40 and a foreign substance is not present inside the cooking chamber 40, and the clean cooking chamber image may be stored in the server 270.

As illustrated in FIG. 20, the cooking apparatus 1 and the server 270 may be connected through the communication device 234 (401).

When the cooking apparatus 1 and the server 270 are connected, the controller 231 may receive the clean cooking chamber image from the server 270.

The controller 231 may determine whether the inside of the cooking chamber 40 is empty or not by comparing the clean cooking chamber image received from the server 270 with the image obtained through the camera 80 (402).

The controller 231 may display a message, which guides to empty the cooking chamber, on the display 240 or the user device 280 based on determining that the inside of the cooking chamber 40 is not empty.

The controller 231 may operate the camera 80 based on determining that the inside of the cooking chamber 40 is empty, and may transmit the image obtained by the camera 80 to the server 270 (404). The server 270 may update the clean cooking chamber image by comparing the received image with the clean cooking chamber image stored in the server 270.

Figure 21:
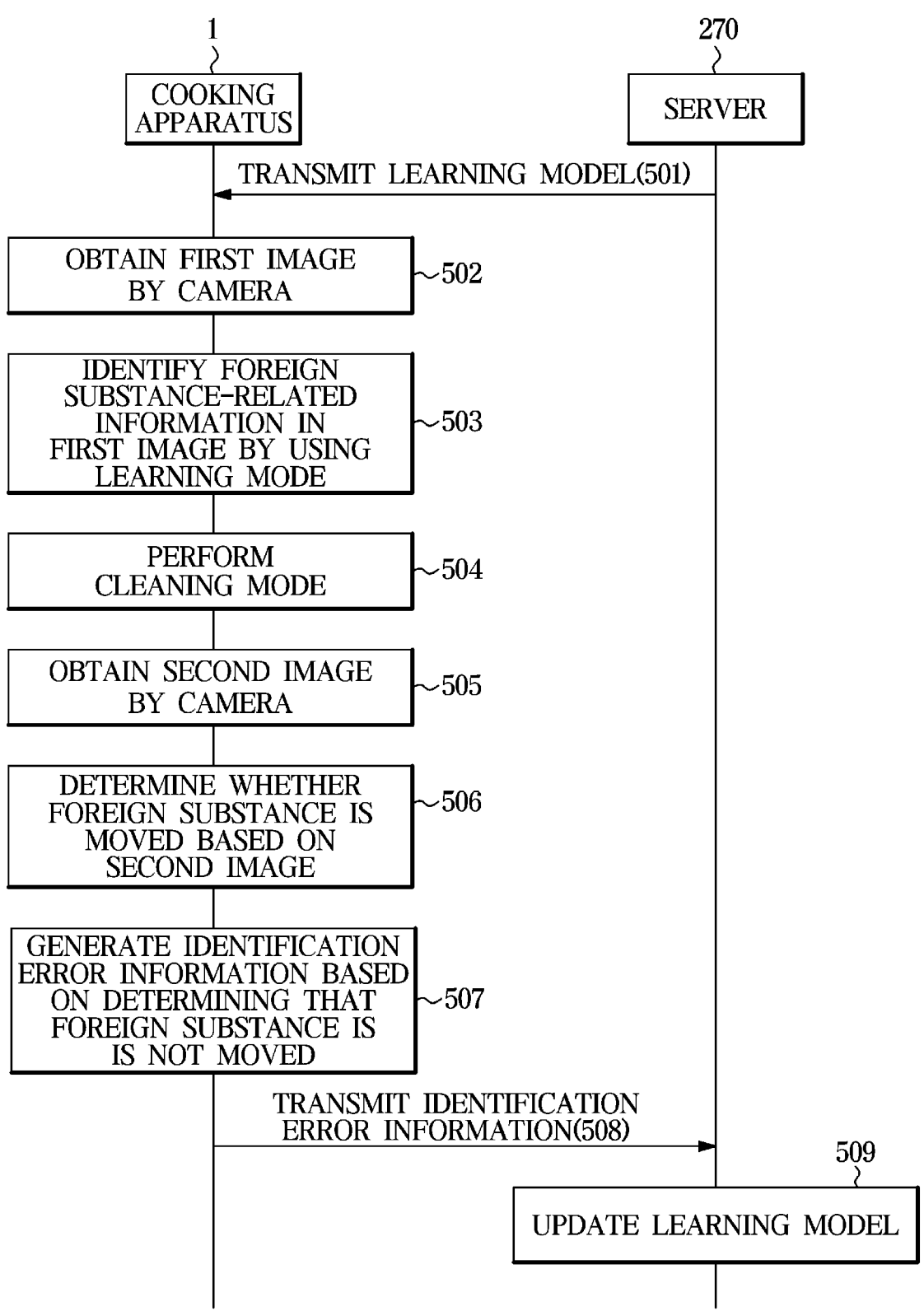
FIG. 21 is a flowchart illustrating an interaction between the cooking apparatus and the server according to an embodiment of the disclosure.

FIG. 21 is a flowchart illustrating an interaction between the cooking apparatus and the server according to an embodiment of the disclosure.

Referring to FIG. 21, the cooking apparatus 1 may obtain the learning model used to identify the foreign substance-related information, from the server 270 (501). The learning model transmitted from the server 270 may be stored in the memory 233 of the cooking apparatus 1.

The cooking apparatus 1 may obtain a first image of the inside of the cooking chamber 40 using the camera 80 (502).

The cooking apparatus 1 may identify foreign substance-related information in the first image by using the learning model (503). The identifying foreign substance-related information may include determining whether foreign substance is present to at least partially block the lens 85 or the transparent member 17.

The cooking apparatus 1 may perform the cleaning mode to remove the foreign substance from blocking the lens 85 or the transparent member 17, based on the determining that the foreign substance is present (504).

After performing the cleaning mode, the cooking apparatus 1 may obtain a second image of the inside of the cooking chamber 40 using the camera 80 (505).

Based on the second image, the cooking apparatus 1 may determine whether the foreign substance is removed by performing the cleaning mode.

Further, based on the second image, the cooking apparatus 1 may determine whether at least a foreign substance is moved through the cleaning mode (506). By comparing the first image before the cleaning mode with the second image after the cleaning mode, the cooking apparatus 1 may determine whether the foreign substance is moved through the cleaning mode.

The cooking apparatus 1 may determine that there is an error in the foreign substance identification based on determining that the foreign substance is not moved, and may generate foreign substance identification error information (507). That is, the cooking apparatus 1 may determine that the identified foreign substance is not a foreign substance attached to the lens 85 of the camera 80 or the transparent member 17, but the cooking apparatus 1 may determine that the identified foreign substance is a foreign substance inside the cooking chamber 40 or a food to be cooked.

The cooking apparatus 1 may transmit the foreign substance identification error information to the server 270 (508).

The server 270 may update the learning model using the received foreign substance identification error information (509).

Figure 22:
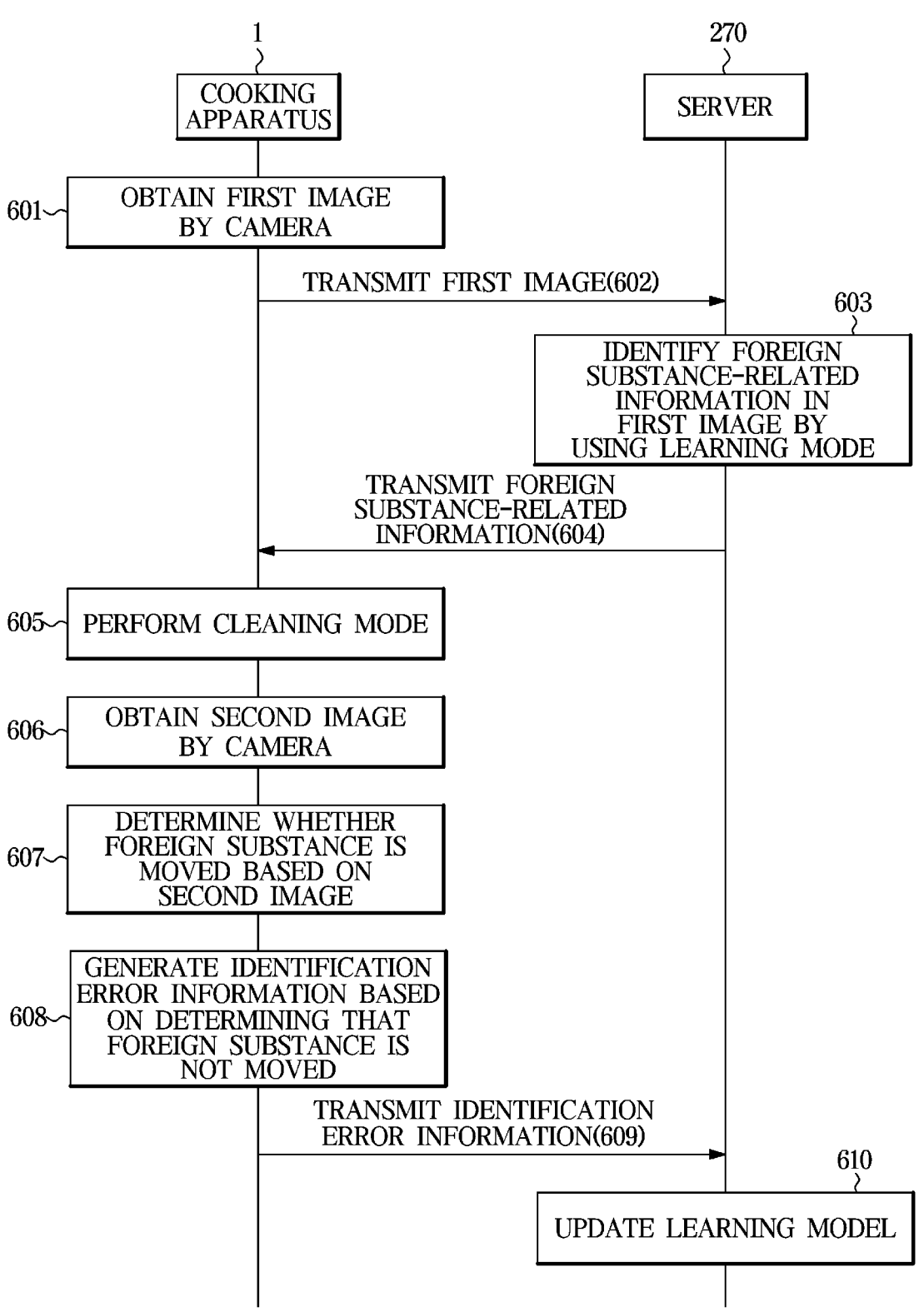
FIG. 22 is a flowchart illustrating an interaction between the cooking apparatus and the server according to an embodiment of the disclosure.

FIG. 22 is a flowchart illustrating an interaction between the cooking apparatus and the server according to an embodiment of the disclosure.

Referring to FIG. 22, the cooking apparatus 1 may obtain a first image of the inside of the cooking chamber 40 using the camera 80 (601).

The cooking apparatus 1 may transmit the first image to the server 270 (602).

The server 270 may identify foreign substance-related information from the first image by using the learning model (603). The identifying foreign substance-related information may include determining whether foreign substance is present to at least partially block the lens 85 or the transparent member 17.

The server 270 may transmit the identified foreign substance-related information to the cooking apparatus 1 (604).

The cooking apparatus 1 may perform the cleaning mode to remove the foreign substance from blocking the lens 85 or the transparent member 17, based on the determining that the foreign substance is present (605).

After performing the cleaning mode, the cooking apparatus 1 may obtain a second image of the inside of the cooking chamber 40 using the camera 80 (606).

Based on the second image, the cooking apparatus 1 may determine whether the foreign substance is removed by performing the cleaning mode.

Further, based on the second image, the cooking apparatus 1 may determine whether at least a foreign substance is moved through the cleaning mode (607). The cooking apparatus 1 may determine whether the foreign substance is moved through the cleaning mode by comparing the first image before the cleaning mode with the second image after the cleaning mode.

The cooking apparatus 1 may determine that there is an error in the foreign substance identification based on determining that the foreign substance is not moved, and may generate foreign substance identification error information (608). That is, the cooking apparatus 1 may determine that the identified foreign substance is not a foreign substance attached to the lens 85 of the camera 80 or the transparent member 17, but the cooking apparatus 1 may determine that the identified foreign substance is a foreign substance inside the cooking chamber 40 or a food to be cooked.

The cooking apparatus 1 may transmit the foreign substance identification error information to the server 270 (609).

The server 270 may update the learning model using the received foreign substance identification error information (610).

Figure 23:
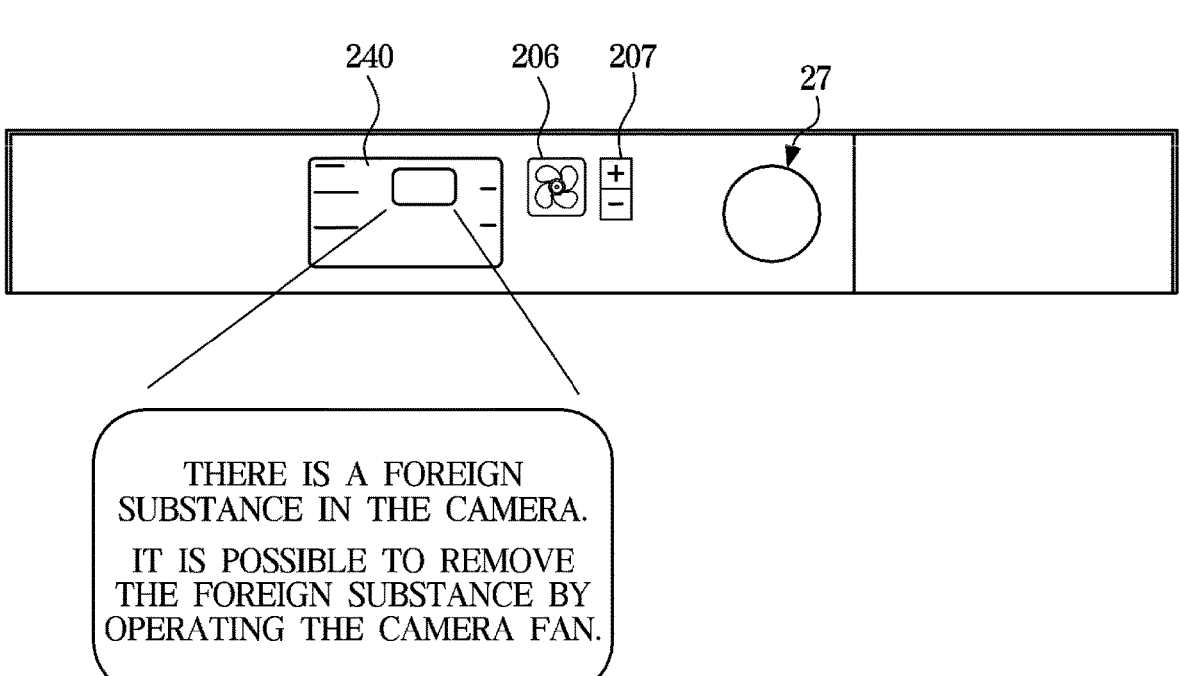
FIG. 23 is a view illustrating a state in which foreign substance-related information is displayed on a display according to an embodiment of the disclosure.
Figure 24:
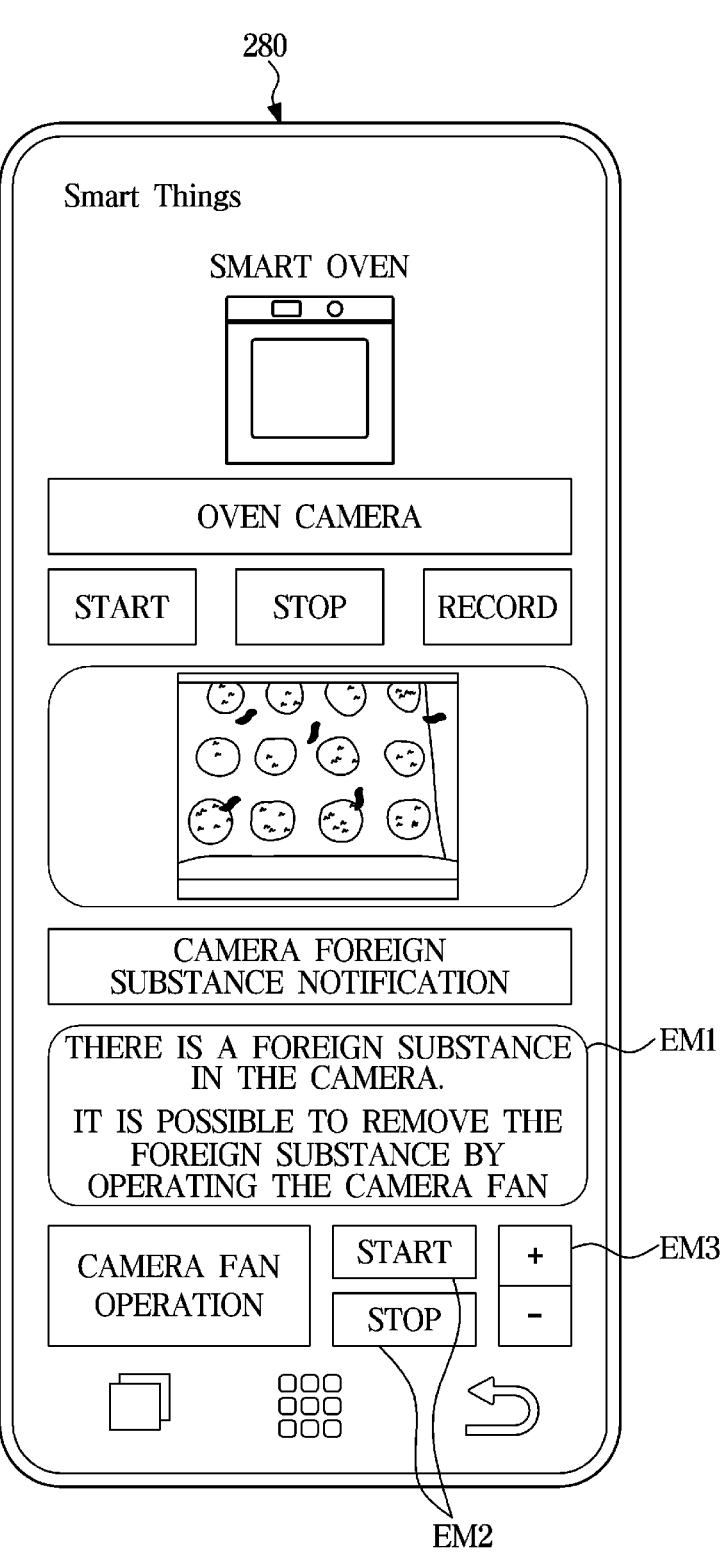
FIG. 24 is a view illustrating a state in which foreign substance-related information is displayed on a user device according to an embodiment of the disclosure.
Figure 25:
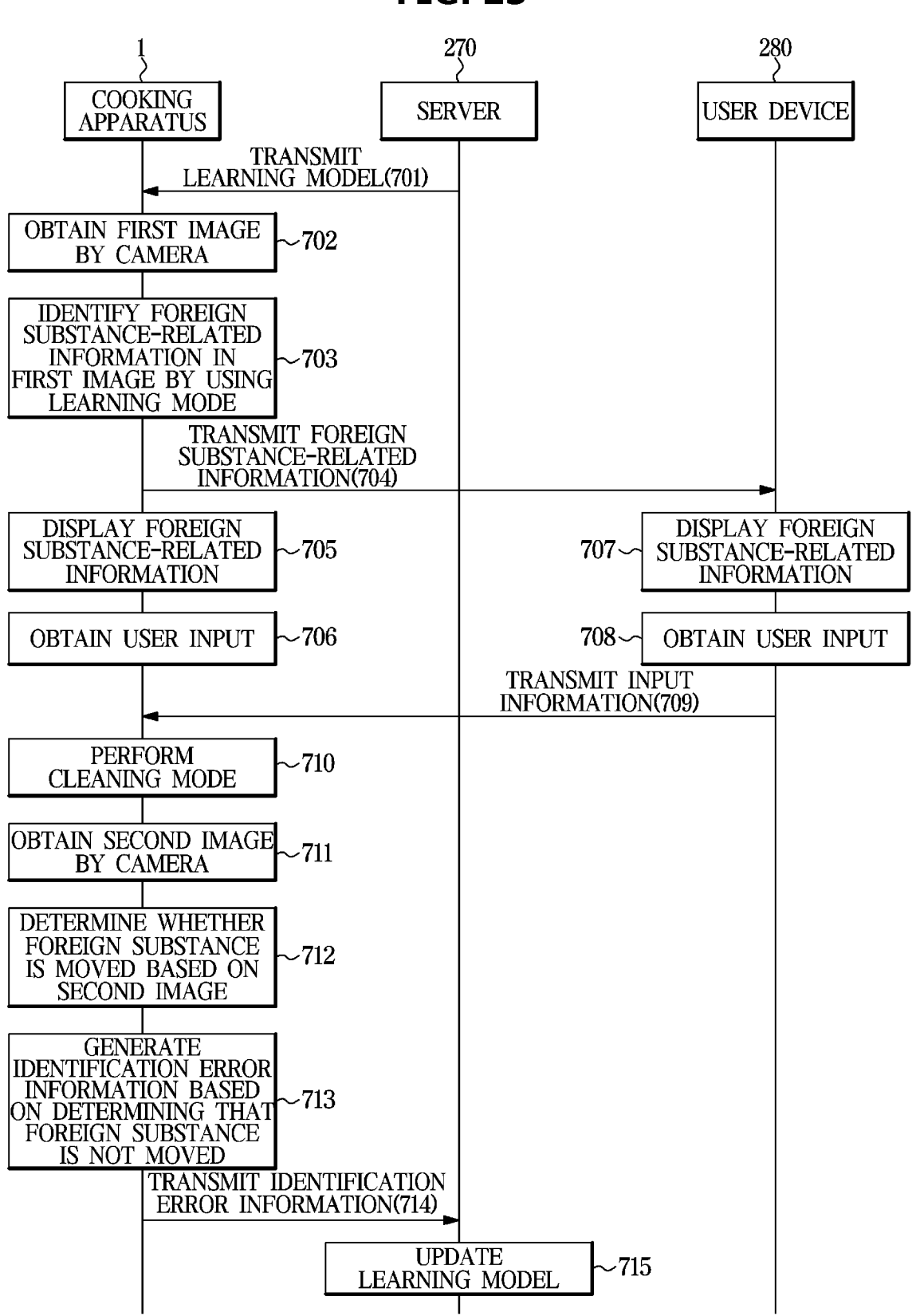
FIG. 25 is a flowchart illustrating an interaction between the cooking apparatus, the server, and the user device according to an embodiment of the disclosure.
Figure 26:
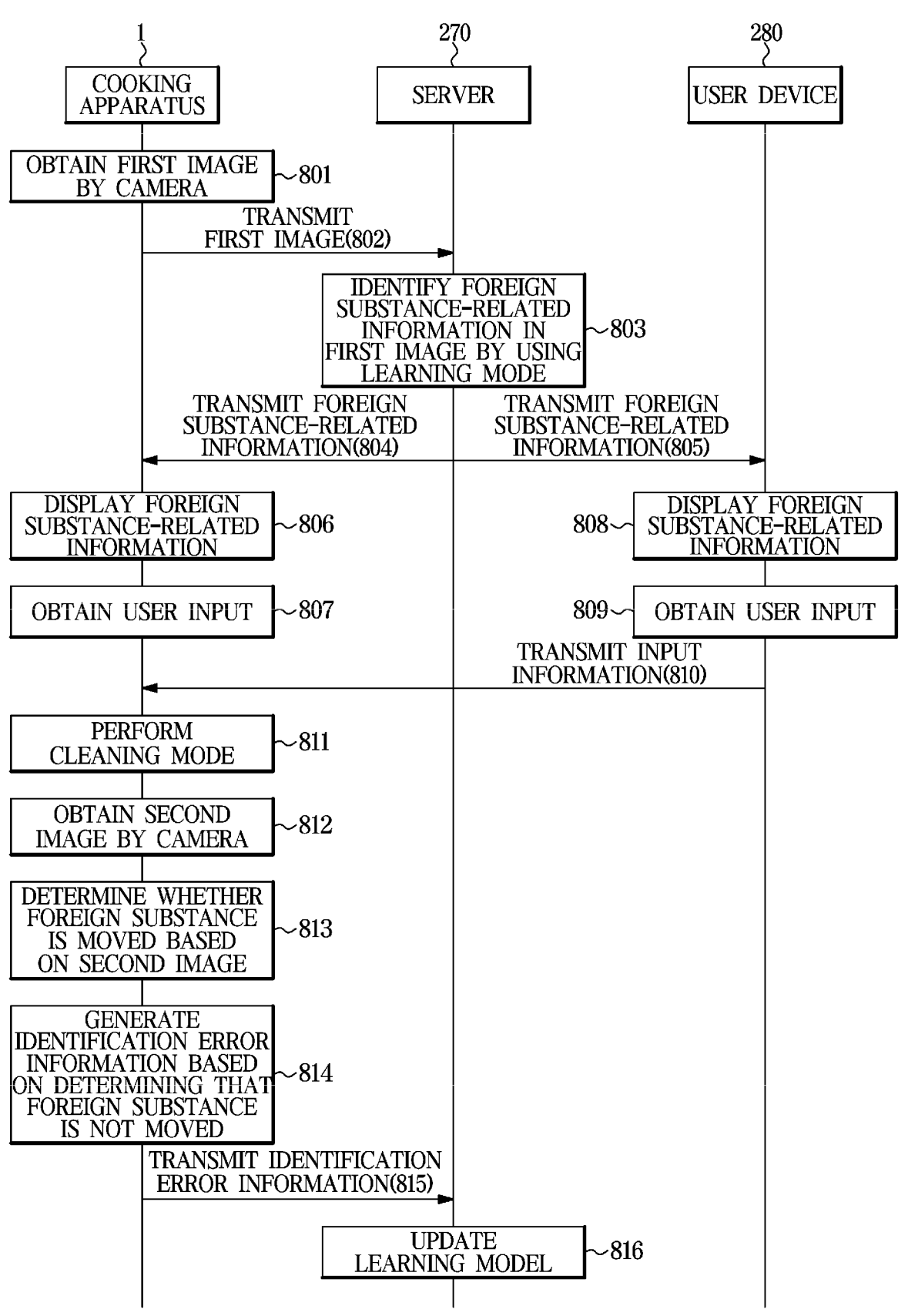
FIG. 26 is a flowchart illustrating an interaction between the cooking apparatus, the server, and the user device according to an embodiment of the disclosure.

FIG. 23 is a view illustrating a state in which foreign substance-related information is displayed on a display according to an embodiment of the disclosure. FIG. 24 is a view illustrating a state in which foreign substance-related information is displayed on a user device according to an embodiment of the disclosure. FIG. 25 is a flowchart illustrating an interaction between the cooking apparatus, the server, and the user device according to an embodiment of the disclosure. FIG. 26 is a flowchart illustrating an interaction between the cooking apparatus, the server, and the user device according to an embodiment of the disclosure.

The cooking apparatus 1 may control the operation of the camera cooling fan motor 91 to perform the cleaning mode based on a user input obtained through the inputter 200.

Referring to FIG. 25, the cooking apparatus 1 may obtain a learning model used to identify foreign substance-related information from the server 270 (701). The learning model transmitted from the server 270 may be stored in the memory 233 of the cooking apparatus 1.

The cooking apparatus 1 may obtain a first image of the inside of the cooking chamber 40 using the camera 80 (702).

The cooking apparatus 1 may identify foreign substance-related information from the first image by using the learning model (703). The identifying foreign substance-related information may include determining whether foreign substance is present to at least partially block the lens 85 or the transparent member 17. The cooking apparatus 1 may determine whether a foreign substance is present in the lens 85 of the camera 80 or the transparent member 17 based on the first image.

The cooking apparatus 1 may display the foreign substance-related information on the display 240 (705). That is, as shown in FIG. 23, the display 240 may display a message such as "There is a foreign substance in the camera. It is possible to remove the foreign substance by operating the camera fan"

The cooking apparatus 1 may obtain a user input through the inputter 200 (706). The inputter 200 may include the camera cooling fan button 206 configured to receive a command to operate the camera cooling fan 90. The inputter 200 may further include a wind speed control button 207 configured to adjust the rotation speed of the camera cooling fan 90.

The cooking apparatus 1 may perform the cleaning mode based on the user input through the inputter 200 (710).

The cooking apparatus 1 may transmit the foreign substance-related information to the user device 280 (704).

The user device 280 may display the foreign substance-related information (707). For example, as shown in FIG. 24, a message EM1 such as "There is a foreign substance in the camera. It is possible to remove the foreign substance by operating the camera fan" may be displayed on the user device 280.

The user device 280 may obtain a user input (708). The user device 280 may display an interface element EM2 for receiving a user command for operating the camera cooling fan 90. In addition, the user device 280 may display an interface element EM3 for receiving a user command for adjusting the rotation speed of the camera cooling fan 90. When a user presses the interface element EM2 and the interface element EM3, the user device 280 may generate user input information and transmit the user input information to the cooking apparatus 1 (709). The cooking apparatus 1 may perform the cleaning mode according to the user input information (710).

After performing the cleaning mode, the cooking apparatus 1 may obtain a second image of the inside of the cooking chamber 40 using the camera 80 (711).

Based on the second image, the cooking apparatus 1 may determine whether a foreign substance is removed by performing the cleaning mode.

Further, based on the second image, the cooking apparatus 1 may determine whether at least a foreign substance is moved through the cleaning mode (712). The cooking apparatus 1 may determine whether the foreign substance is moved through the cleaning mode by comparing the first image before the cleaning mode with the second image after the cleaning mode.

The cooking apparatus 1 may determine that there is an error in the foreign substance identification based on determining that the foreign substance is not moved, and may generate foreign substance identification error information (713). That is, the cooking apparatus 1 may determine that the identified foreign substance is not a foreign substance attached to the lens 85 of the camera 80 or the transparent member 17, but the cooking apparatus 1 may determine that the identified foreign substance is a foreign substance inside the cooking chamber 40 or a food to be cooked.

The cooking apparatus 1 may transmit the foreign substance identification error information to the server 270 (714).

The server 270 may update the learning model using the received foreign substance identification error information (715).

Referring to FIG. 26, the cooking apparatus 1 may obtain a first image of the inside of the cooking chamber 40 using the camera 80 (801).

The cooking apparatus 1 may transmit the first image to the server 270 (802).

The server 270 may identify foreign substance-related information from the first image by using the learning model (803). The identifying foreign substance-related information may include determining whether foreign substance is present to at least partially block the lens 85 or the transparent member 17.

The server 270 may transmit the identified foreign substance-related information to the cooking apparatus 1 (804).

The cooking apparatus 1 may display the foreign substance-related information on the display 240 (806). That is, as shown in FIG. 23, the display 240 may display a message such as "There is a foreign substance in the camera. It is possible to remove the foreign substance by operating the camera fan"

The cooking apparatus 1 may obtain a user input through the inputter 200 (807). The inputter 200 may include the camera cooling fan button 206 configured to receive a command to operate the camera cooling fan 90. The inputter 200 may further include the wind speed control button 207 configured to adjust the rotation speed of the camera cooling fan 90.

The cooking apparatus 1 may perform the cleaning mode based on the user input through the inputter 200 (811).

The server 270 may transmit the identified foreign substance-related information to the user device 280 (805).

The user device 280 may display the foreign substance-related information (808). For example, as shown in FIG. 24, the message EM1 such as "There is a foreign substance in the camera. It is possible to remove the foreign substance by operating the camera fan" may be displayed on the user device 280.

The user device 280 may obtain a user input (809). The user device 280 may display the interface element EM2 for receiving a user command for operating the camera cooling fan 90. In addition, the user device 280 may display the interface element EM3 for receiving a user command for adjusting the rotation speed of the camera cooling fan 90. When a user presses the interface element EM2 and the interface element EM3, the user device 280 may generate user input information and transmit the user input information to the cooking apparatus 1 (810). The cooking apparatus 1 may perform the cleaning mode according to the user input information (811).

After performing the cleaning mode, the cooking apparatus 1 may obtain a second image of the inside of the cooking chamber 40 using the camera 80 (812).

Based on the second image, the cooking apparatus 1 may determine whether a foreign substance is removed by performing the cleaning mode.

Further, based on the second image, the cooking apparatus 1 may determine whether at least a foreign substance is moved through the cleaning mode (813). The cooking apparatus 1 may determine whether the foreign substance is moved through the cleaning mode by comparing the first image before the cleaning mode with the second image after the cleaning mode.

The cooking apparatus 1 may determine that there is an error in the foreign substance identification based on determining that the foreign substance is not moved, and may generate foreign substance identification error information (814). That is, the cooking apparatus 1 may determine that the identified foreign substance is not a foreign substance attached to the lens 85 of the camera 80 or the transparent member 17, but the cooking apparatus 1 may determine that the identified foreign substance is a foreign substance inside the cooking chamber 40 or a food to be cooked.

The cooking apparatus 1 may transmit the foreign substance identification error information to the server 270 (815).

The server 270 may update the learning model using the received foreign substance identification error information (816).

Figure 27:
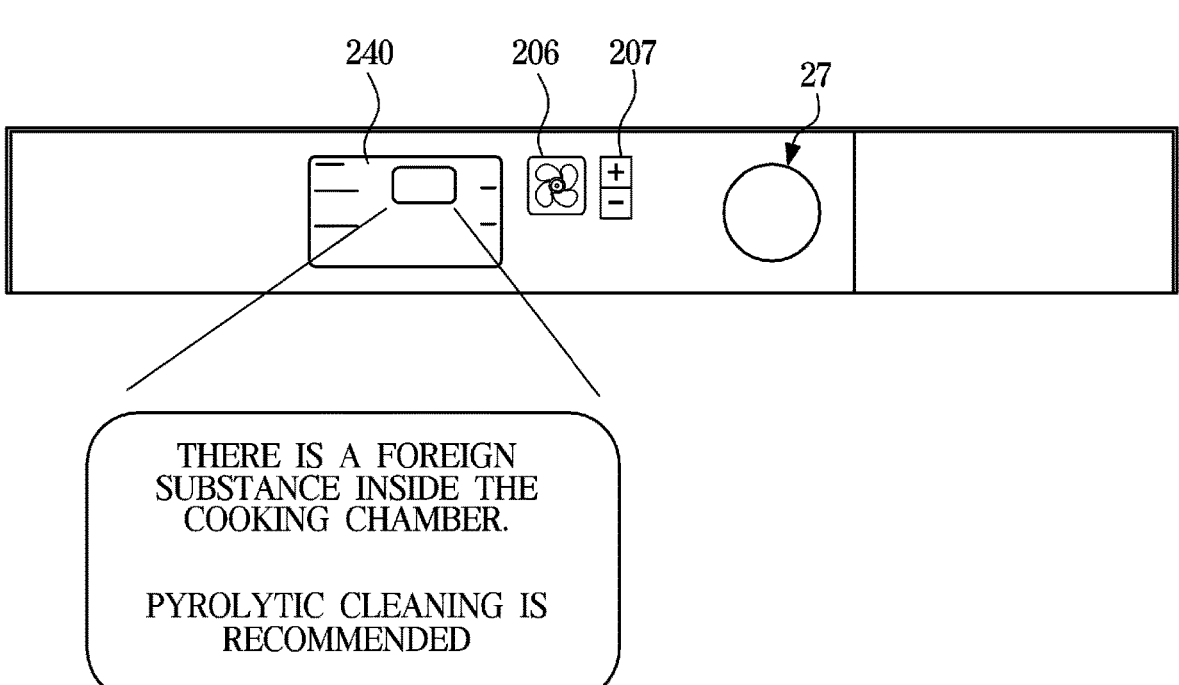
FIG. 27 is a view illustrating a state in which information recommending pyrolytic cleaning is displayed on the display according to an embodiment of the disclosure.
Figure 28:
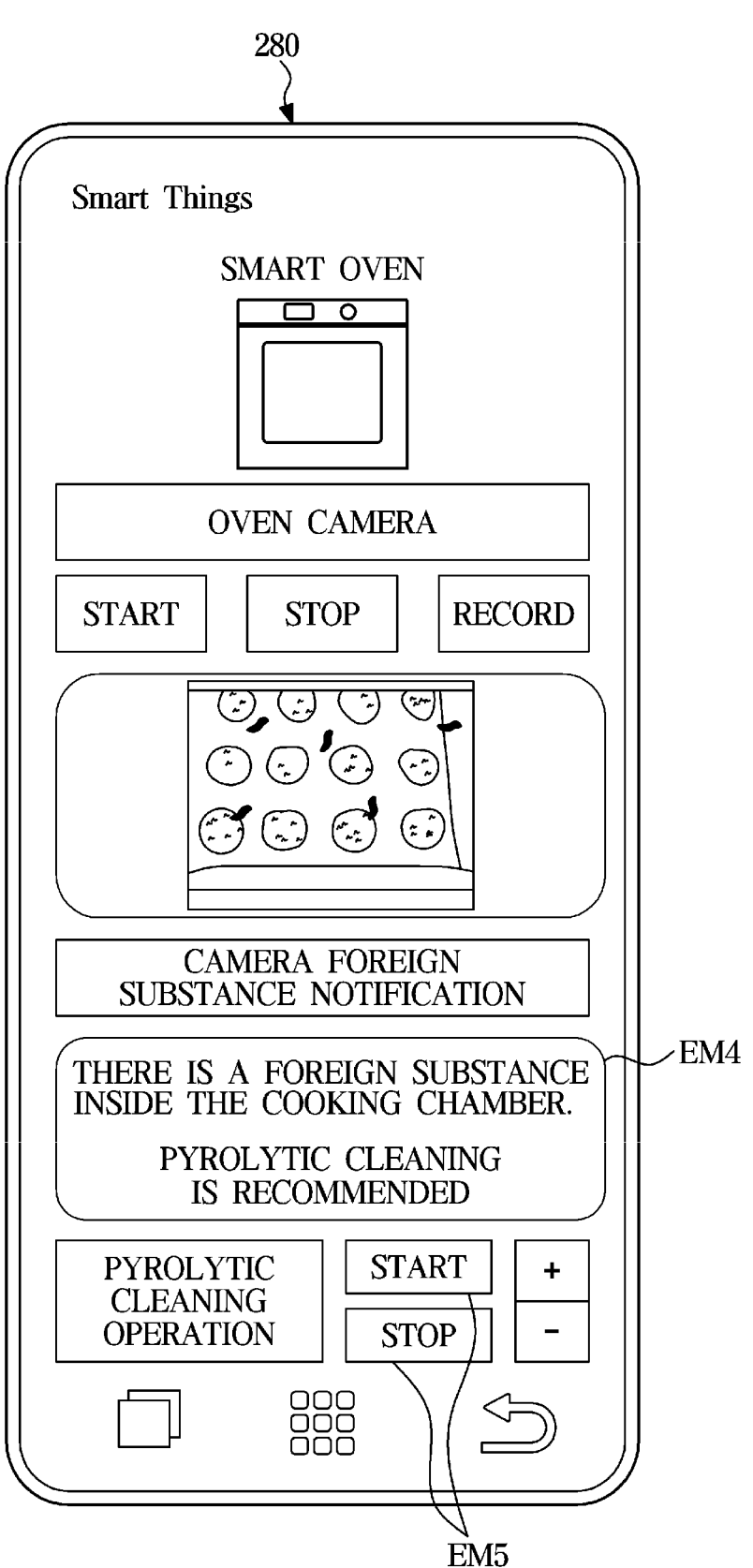
FIG. 28 is a view illustrating a state in which information recommending the pyrolytic cleaning is displayed on the user device according to an embodiment of the disclosure.

FIG. 27 is a view illustrating a state in which information recommending pyrolytic cleaning is displayed on the display according to an embodiment of the disclosure. FIG. 28 is a view illustrating a state in which information recommending the pyrolytic cleaning is displayed on the user device according to an embodiment of the disclosure.

The controller 231 may determine whether a foreign substance is removed after the last cleaning mode is performed, and when it is determined that the foreign substance is not removed, the controller 231 may determine whether the identified foreign substance is a foreign substance inside the cooking chamber 40.

That is, the controller 231 may determine whether the identified foreign substance is not a foreign substance attached to the lens 85 of the camera 80 or the transparent member 17, but a foreign substance such as oil attached to the lower wall 13 of the cooking chamber 40.

In response to the determine that the identified foreign substance is a foreign substance in the cooking chamber 40 and in response to the ratio of the area occupied by the foreign substance to the entire area of the image exceeding a predetermined ratio, the controller 231 may display visual information recommending pyrolytic cleaning on the display 240, as illustrated in FIG. 27.

Further, the controller 231 may allow visual information for recommending pyrolytic cleaning to be displayed on the user device 280. For example, as shown in FIG. 24, a message EM4 such as "There is a foreign substance inside the cooking chamber. Pyrolytic cleaning is recommended" may be displayed.

The user device 280 may display an interface element EM5 for receiving a user command for performing a pyrolytic cleaning operation. When a user presses the interface element EM5, the user device 280 may generate user input information and transmit the user input information to the cooking apparatus 1. The cooking apparatus 1 may perform the pyrolytic cleaning operation through the heating devices 5 and 8 according to user input information.

Figure 29:
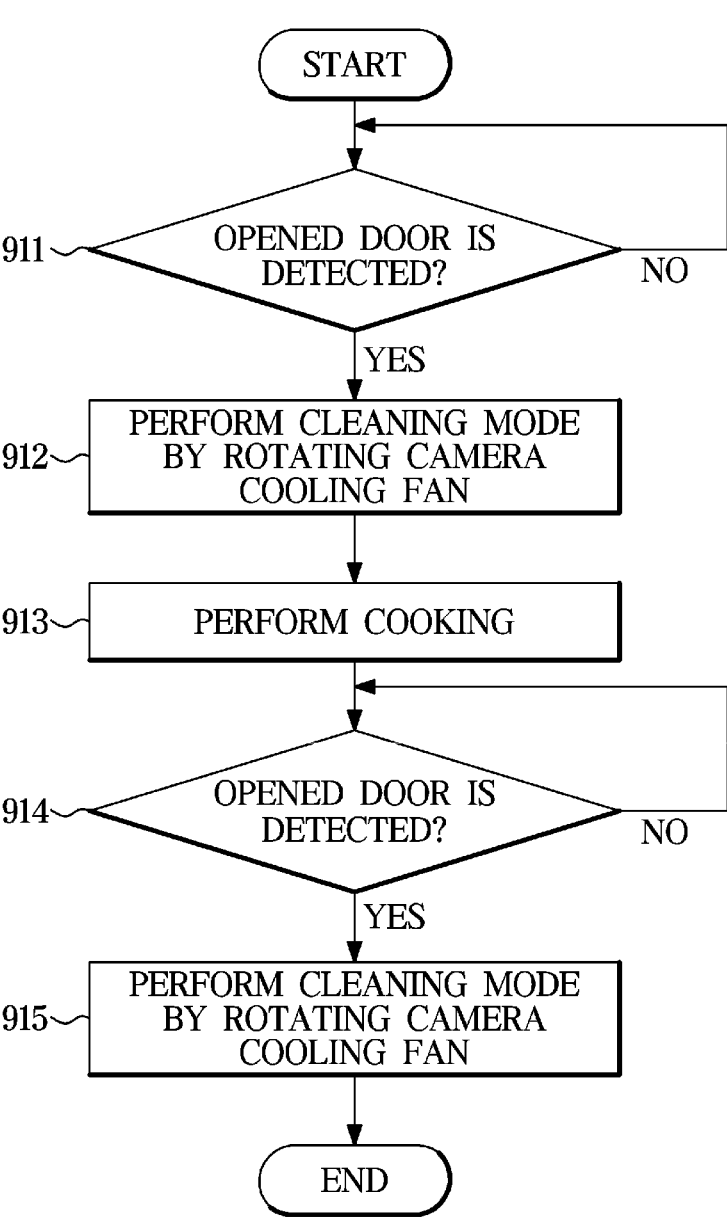
FIG. 29 is a flowchart illustrating a method of controlling the cooking apparatus according to an embodiment of the disclosure.

FIG. 29 is a flowchart illustrating a method of controlling the cooking apparatus according to an embodiment of the disclosure.

The cleaning mode may be performed periodically regardless of whether the foreign substance is present in the lens 85 of the camera 80 or the transparent member 17. For example, the cleaning mode may be performed periodically before cooking or after cooking. The cleaning mode may be performed in conjunction with the opening and closing operation of the door 2. That is, the cleaning mode may be performed whenever the door 2 is opened or the cleaning mode may be performed whenever the door 2 is closed.

FIG. 29 illustrates an embodiment in which the cleaning mode is performed periodically whenever the door 2 is opened.

The controller 231 may determine whether the door 2 is opened based on the detection signal of the door opening and closing sensor 220 (911).

Based on determining that the door 2 is opened, the controller 231 may control the camera cooling fan motor 91 to perform the cleaning mode by rotating the camera cooling fan 90 (912).

The controller 231 may perform cooking after the completion of the cleaning mode (913).

After the completion of the cooking, the controller 231 may determine whether the door 2 is opened based on a detection signal from the door opening and closing sensor 220 (914).

Based on determining that the door 2 is opened, the controller 231 may control the camera cooling fan motor 91 to perform the cleaning mode by rotating the camera cooling fan 90 (915).

Through the periodic foreign substance cleaning mode, the function of the camera 80 may be stably maintained for a long period of time.

According an embodiment, the cooking apparatus 1 includes a case 11, a cooking chamber 40 formed inside the case 11, the camera 80 configured to obtain an image inside of the cooking chamber, the camera having a lens, a transparent member 17 disposed in front of the lens of the camera so that the camera obtains the image inside of the cooking chamber through the transparent member, the camera cooling fan 90 configured to blow air toward the camera 80, the motor 91 configured to rotate the camera cooling fan 90, and a controller configured to control the camera and the motor.

The controller 231 may operate the camera 80 to obtain the first image of the inside of the cooking chamber 40, identify foreign substance-related information of the lens 85 of the camera 80 or the transparent member 17 based on the obtained first image, and control an operation of the motor 91 to perform the cleaning mode, in which the camera cooling fan 90 is rotated at the first rotation speed for the first rotation time, based on determining that foreign substance is present to at least partially block the lens or the transparent member.

The controller 231 may determine the first rotation speed and the first rotation time based on the determining that the foreign substance is present.

The controller 231 may operate the camera to obtain the second image of the inside of the cooking chamber 40 after the cleaning mode is performed.

The controller 231 may determine whether the foreign substance is removed by the performing of the cleaning mode, based on the obtained second image.

The controller 231 may control an operation of the motor 91 to perform the additional cleaning mode, in which the camera cooling fan 90 is rotated at the second rotation speed for the second rotation time, based on the determining that the foreign substance has not been removed.

The second rotation speed may be greater than the first rotation speed.

The controller 231 may operate the camera 80 to obtain a second image inside of the cooking chamber 40 after the cleaning mode is performed.

The controller 231 may determine whether the foreign substance has been removed by the performing of the cleaning mode, based on the obtained second image.

The controller 231 may generate identification error information based on the determining that the foreign substance has not been removed.

The controller 231 may include the memory 233 configured to store a learning model which is used for identifying the foreign substance-related information.

The stored learning model may output the foreign substance-related information based on the obtained first image being input to the learning model by the controller 231.

The cooking apparatus may further include the communication device 234 configured to communicate with the server 270.

The controller 231 may obtain a learning model which is used for identifying the foreign substance-related information from the server 270 through the communication device 234.

The controller 231 may control the communication device 234 to transmit the identification error information to the server 270.

The foreign substance-related information comprises at least one of presence or absence of foreign substance, a number of foreign substances, and a ratio of an area occupied by the foreign substance to an entire area of the obtained first image.

The controller 231 may identify the foreign substance-related information based on focus information of the obtained first image.

The controller 231 may identify the foreign substance-related information based on a result of comparing the first image with the clean cooking chamber image.

The cooking apparatus may further include the display 240, and the controller 231 may control the display 240 to display the foreign substance-related information.

The cooking apparatus may further include the inputter 200 configured to obtain a user input, and the controller 231 may control the operation of the motor 91 to perform the cleaning mode based on the user input obtained through the inputter 200.

The cooking apparatus may further include the communication device 234 configured to communicate with the server 270. The controller 231 may control the communication device 234 to transmit display information, which is to display the foreign substance-related information on an external user device 280, to the server 270.

The controller 231 may determine whether the foreign substance is present based on the obtained first image, and the controller 231 may control the display to display visual information to recommend pyrolytic cleaning, based on the determining that foreign substance is present.

According an embodiment, the cooking apparatus includes a case 11, a cooking chamber 40 formed inside the case 11, the door 2 configured to open or close the cooking chamber 40, the door sensor 220 configured to detect opening or closing of the door 2, the camera 80 configured to obtain an image inside of the cooking chamber 40, the camera cooling fan 90 configured to blow air toward the camera 80, the motor 91 configured to rotate the camera cooling fan 90, and the controller 23 configured to electrically connected to the door sensor 220 and the motor 91.

The controller 231 may control an operation of the motor 91 to rotate the camera cooling fan 90 based on the detection of the opening of the door or the closing of the door by the sensor 220.

According an embodiment, the control method of the cooking apparatus includes operating the camera 80 to obtain the first image of an inside of the cooking chamber 40, identifying foreign substance-related information of the lens 85 of the camera 80 or the transparent member 17 of the cooking chamber 40 based on the first image by using a learning model obtained from the memory 233 or the serve 270, and controlling an operation of a motor 91 to perform a cleaning mode, in which a camera cooling fan 90 is rotated at a first rotation speed for a first rotation time to remove, based on determining that foreign substance is present to at least partially block the lens 85 or the transparent member 17.

The control method may further include operating the camera 80 to obtain the second image of the inside of the cooking chamber 40 after the cleaning mode is performed, determining whether the foreign substance is removed by the performing of cleaning mode, based on the obtained second image by using the learning model, and controlling an operation of the motor 91 to perform the additional cleaning mode, in which the camera cooling fan 90 is rotated at the second rotation speed for the second rotation time, based on determining that the foreign substance has not been removed.

The control method may further include operating the camera 80 to obtain the second image of the inside of the cooking chamber 40 after the cleaning mode is performed, determining whether the foreign substance has been moved by the performing of the cleaning mode, based on the obtained second image by using the learning model, generating identification error information based on the determining that the foreign substance has not been moved, and controlling the communication device 234 to transmit the identification error information to a serve 270.

The control method may further include controlling the communication device 234 to transmit display information, which is to display the foreign substance-related information on the external user device 280, to the server 270.

The operating of the camera 80 to obtain the first image and the identifying of the foreign substance-related information may be performed based on an opening or closing of a door configured to open or close the cooking chamber.

As is apparent from the above description, a cooking apparatus may include a camera cooling structure configured to prevent a temperature rise of a camera caused by heat generated in a cooking chamber.

Further, it is possible to prevent foreign substances such as water and oil from entering through a suction duct used to cool a camera.

Further, a bottom of a camera may be efficiently cooled.

Further, a camera cooling structure for intensively cooling a camera may be separated from a cooling structure for cooling an entire electronic compartment, and thus an efficiency of the cooling structure for the electronic compartment may not decrease.

Further, an electronic component such as a circuit board as well as a camera may be efficiently cooled.

Further, a camera of a cooking apparatus may image an entire shelf regardless of an installation height of the shelf.

Further, a camera cooling structure may provide a uniform and strong air flow to a bottom of the camera, and thus it is possible to prevent a foreign substance from being attached to the camera or it is possible to remove a foreign substance attached to the camera.

Further, a cooking apparatus may recognize that a foreign substance such as dust is attached around a camera and remove the foreign substance by using a camera cooling fan.

Further, a cooking apparatus may allow a camera to function normally by periodically removing a foreign substance around the camera.

Further, foreign substance identification errors may be reduced by updating a learning model for identifying foreign substance-related information.

The effects of the present disclosure are not limited to those mentioned above, and other effects not mentioned will be apparent from the following description to one of ordinary skill in the art to which the present disclosure belongs.

Although a few embodiments of the disclosure have been shown and described, it would be appreciated by those skilled in the art that changes may be made in these embodiments without departing from the principles and spirit of the disclosure, the scope of which is defined in the claims and their equivalents.

What is claimed is:

1. A cooking apparatus comprising:
   a case;
   a cooking chamber formed inside the case;
   a camera configured to obtain an image inside of the cooking chamber, the camera having a lens;
   a transparent member disposed in front of the lens of the camera so that the camera obtains the image inside of the cooking chamber through the transparent member;
   a camera cooling fan configured to blow air toward the camera;
   a motor configured to rotate the camera cooling fan; and
   a controller configured to control the camera and the motor,
   wherein the controller is further configured to:
      operate the camera to obtain a first image inside of the cooking chamber;
      identify first foreign substance-related information of the lens of the camera or the transparent member based on the obtained first image, the first foreign substance-related information including a ratio of an area occupied by foreign substance to an entire area of the obtained first image;
      determine whether the foreign substance at least partially blocks the lens or the transparent member based on the identified first foreign substance-related information;
      control the motor to perform a first cleaning mode, in which the camera cooling fan is rotated at a first rotation speed for a first rotation time to remove the foreign substance that at least partially blocking the lens or the transparent member; and
      in response to the determining that the foreign substance has not been removed after the first cleaning mode is performed, control the motor to perform a second cleaning mode, in which the camera cooling fan is rotated at a second rotation speed for a second rotation time.

2. The cooking apparatus of claim 1, wherein the controller is further configured to:
   operate the camera to obtain a second image inside of the cooking chamber after the first cleaning mode is performed;
   identify second foreign substance-related information of the lens of the camera or the transparent member based on the obtained second image;
   determine whether the foreign substance that at least partially blocking the lens or the transparent member has been removed by the performing the first cleaning mode, based on the identified second foreign substance-related information; and
   control the motor to perform the second cleaning mode based on the determining that the foreign substance has not been removed after the first cleaning mode is performed.

3. The cooking apparatus of claim 2, wherein the second rotation speed is greater than the first rotation speed.

4. The cooking apparatus of claim 2, wherein the controller is further configured to:

generate identification error information based on the determining that the foreign substance has not been removed after the first cleaning mode is performed, the identification error information including information that the foreign substance is not a foreign substance attached to the lens of the camera nor the transparent member but a foreign substance inside the cooking chamber or a food to be cooked.

5. The cooking apparatus of claim 4, further comprising a memory configured to store a learning model which is used for identifying the first and second foreign substance-related information, wherein the stored learning model respectively outputs the first and second foreign substance-related information based on the obtained first image and the obtained second image being input to the learning model by the controller.

6. The cooking apparatus of claim 4, further comprising:

a communication device configured to communicate with a server, wherein the controller is further configured to:

obtain a learning model which is used for identifying the first and second foreign substance-related information from the server through the communication device; and control the communication device to transmit the identification error information to the server.

7. The cooking apparatus of claim 1, wherein the first foreign substance-related information further comprises at least one of presence or absence of foreign substance, and a number of foreign substances.

8. The cooking apparatus of claim 1, wherein the controller is further configured to respectively identify the first foreign substance-related information based on focus information of the obtained first image.

9. The cooking apparatus of claim 1, wherein the controller is configured to identify the first foreign substance-related information based on a result of comparing the first image with a clean cooking chamber image which is an image of the cooking chamber in a clean state without the foreign substance.

10. The cooking apparatus of claim 1, further comprising:

a display, wherein the controller is configured to control the display to display the first foreign substance-related information.

11. The cooking apparatus of claim 1, further comprising:

an inputter configured to obtain a user input, wherein the controller is configured to respectively control the motor to perform the first cleaning mode and the second cleaning mode based on the user input obtained through the inputter.

12. The cooking apparatus of claim 1, further comprising:

a communication device configured to communicate with a server, wherein the controller is configured to control the communication device to transmit display information including the first foreign substance-related information on an external user device, to the server.

13. The cooking apparatus of claim 1, further comprising:

a display, wherein the controller is configured to:

control the display to display visual information to recommend pyrolytic cleaning for the second cleaning mode, based on the determining that the foreign substance has not been removed after the first cleaning mode is performed is present.

14. The cooking apparatus of claim 1, further comprising:

a door configured to open or close the cooking chamber; and a door sensor configured to detect an opening or a closing of the door, wherein the controller is further configured to:

control the motor to rotate the camera cooling fan based on the detection of the opening of the door by the sensor.

15. A control method of a cooking apparatus including a cooking chamber, a door, a camera including a lens, a transparent member, a camera cooling fan, a motor, a memory and a controller, comprising:

operating the camera to obtain a first image inside of the cooking chamber;

identifying first foreign substance-related information of the lens of the camera or the transparent member of the cooking chamber based on the obtained first image by using a learning model obtained from the memory or a server, the first foreign substance-related information including a ratio of an area occupied by foreign substance to an entire area of the obtained first image;

determining whether the foreign substance at least partially blocks the lens or the transparent member based on the identified first foreign substance-related information;

controlling the motor to perform a first cleaning mode, in which the camera cooling fan is rotated at a first rotation speed for a first rotation time to remove the foreign substance that at least partially blocking the lens or the transparent member; and in response to the determining that the foreign substance has not been removed after the first cleaning mode is performed, controlling the motor to perform a second cleaning mode, in which the camera cooling fan is rotated at a second rotation speed for a second rotation time.

16. The control method of claim 15, further comprising:

operating the camera to obtain a second image inside of the cooking chamber after the first cleaning mode is performed;

identifying second foreign substance-related information of the lens of the camera or the transparent member based on the obtained second image by using the learning model;

determining whether the foreign substance that at least partially blocking the lens or the transparent member has been removed by the performing the first cleaning mode, based on the identified second foreign substance-related information; and controlling the motor to perform the second cleaning mode based on the determining that the foreign substance has not been removed after the performing of the first cleaning mode.

17. The control method of claim 15, further comprising:

generating identification error information based on the determining that the foreign substance has not been removed after the performing of the first cleaning mode, the identification error information including information that the foreign substance is not a foreign substance attached to the lens of the camera nor the transparent member but a foreign substance inside the cooking chamber or a food to be cooked; and controlling a communication device to transmit the identification error information to a server.

18. The control method of claim 17, further comprising:

controlling the communication device to transmit display information, which is to display the first foreign substance-related information on an external user device, to the server.

19. The control method of claim 15, wherein the operating of the camera to obtain the first image and the identifying of the first foreign substance-related information are performed based on an opening of the door.

* * * * *